United States Patent
Atarius et al.

(10) Patent No.: US 10,021,621 B2
(45) Date of Patent: Jul. 10, 2018

(54) UE-TO-UE RELAY LIST AND DETERMINATION OF FLOOR ARBITRATOR

(71) Applicant: QUALCOMM Incorporated, San Diego, CA (US)

(72) Inventors: Roozbeh Atarius, San Diego, CA (US); Michaela Vanderveen, Tracy, CA (US); Haris Zisimopoulos, London (GB); Hong Cheng, Basking Ridge, NJ (US); Arungundram Chandrasekaran Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 15/060,237

(22) Filed: Mar. 3, 2016

(65) Prior Publication Data

US 2016/0295496 A1    Oct. 6, 2016

Related U.S. Application Data

(60) Provisional application No. 62/142,686, filed on Apr. 3, 2015.

(51) Int. Cl.

| H04W 40/00 | (2009.01) |
| H04W 40/32 | (2009.01) |
| H04W 76/14 | (2018.01) |
| H04W 8/00 | (2009.01) |
| H04W 76/02 | (2009.01) |

(Continued)

(52) U.S. Cl.
CPC .......... *H04W 40/32* (2013.01); *H04W 8/005* (2013.01); *H04W 40/246* (2013.01);
(Continued)

(58) Field of Classification Search
CPC ... H04W 80/04; H04W 40/246; H04W 40/24; H04W 88/04; H04W 88/182; H04W 8/26;
(Continued)

(56) References Cited

U.S. PATENT DOCUMENTS

2001/0036810 A1    11/2001 Larsen
2005/0094574 A1    5/2005 Han et al.
(Continued)

FOREIGN PATENT DOCUMENTS

JP    2005072834 A    3/2005
WO    0243335 A1    5/2002

OTHER PUBLICATIONS

"3rd Generation Partnership Project; Technical Specification Group Services and System Aspects; Study on Security Issues to support Proximity Services (ProSe) (Release 13)", 3GPP DRAFT; 33833-130, 3rd Generation Partnership Project (3GPP), Mobile Competence Centre ; 650, Route Des Lucioles; F-06921 Sophia-Antipolis Cedex; France, Feb. 20, 2015 (Feb. 20, 2015), XP050945486, Retrieved from the Internet: URL:http://www.3gpp.org/ftp/Specs/archive/33_series/33.833/ [retrieved on Feb. 20, 2015].
(Continued)

*Primary Examiner* — Nimesh Patel
(74) *Attorney, Agent, or Firm* — Clint R. Morin; Arent Fox, LLP

(57) ABSTRACT

The disclosure provides a mechanism where a user equipment (UE) may communicate with a neighbor UE of the UE's neighbor UE by utilizing the UE's neighbor UE as a relay for the communication between the UE and the neighbor UE of the UE's neighbor UE. In an aspect, the first UE receives a discovery message from a second UE, the discovery message including information about 1-hop neighbor UEs of the second UE. The first UE determines to communicate with a third UE based on the discovery message, the third UE being one of the 1-hop neighbor UEs of the second UE. The first UE requests the second UE to operate as a relay for communication between the first UE and the third UE. The first UE communicates with the third UE through the second UE.

28 Claims, 19 Drawing Sheets

(51) Int. Cl.
*H04W 40/24* (2009.01)
*H04W 88/04* (2009.01)

(52) U.S. Cl.
CPC ......... *H04W 76/023* (2013.01); *H04W 76/14* (2018.02); *H04W 88/04* (2013.01)

(58) Field of Classification Search
CPC ... H04W 8/005; H04W 8/065; H04W 80/045; H04W 84/18; H04W 40/12; H04W 40/04; H04W 40/248; H04W 80/00; H04W 40/00; H04W 40/01; H04W 76/023; H04W 4/005; H04W 64/00; H04W 48/16; H04W 84/005; H04W 16/18; H04W 36/0055; H04W 4/008; H04W 76/02; H04W 4/08; H04W 12/08; H04W 88/02; H04B 7/2606; H04B 7/026; H04B 7/15507; H04B 7/15; H04L 67/16; H04L 12/00

See application file for complete search history.

(56) References Cited

U.S. PATENT DOCUMENTS

| | | |
|---|---|---|
| 2007/0036093 A1 | 2/2007 | Newberg et al. |
| 2008/0013502 A1 | 1/2008 | Clark |
| 2010/0290367 A1 | 11/2010 | Karandikar et al. |
| 2014/0036727 A1 | 2/2014 | Chung et al. |
| 2014/0078935 A1* | 3/2014 | Sun ............ H04W 8/005 370/254 |
| 2015/0085738 A1 | 3/2015 | Kim et al. |
| 2016/0088468 A1* | 3/2016 | Sharma ............ H04W 76/023 370/329 |
| 2016/0286450 A1* | 9/2016 | Badic ............ H04W 4/008 |

OTHER PUBLICATIONS

International Search Report and Written Opinion—PCT/US2016/021029—ISA/EPO—dated Aug. 5, 2016.
QUALCOMM Incorporated: "Discussion on Floor Arbitration for MCPTT Service", 3GPP DRAFT; S6-150079 Discussion on Floor Arbitration for MCPTT Service, 3rd Generation Partnership Project (3GPP), Mobile Competence Centre; 650, Route des Lucioles; F-06921 Sophia-Antipolis Cedex, vol. SA WG6, No. Sorrento, Italy; Jan. 26, 2015-Jan. 30, 2015, Feb. 2, 2015 (Feb. 2, 2015), XP050965071, Retrieved from the Internet: URL:http://www.3gpp.org/ftp/tsg_sa/WG6_MissionCritical/TSGS6_001_Sorrento/docs/ [retrieved on Feb. 2, 2015].
Partial International Search Report—PCT/US2016/021029—ISA/EPO—dated Apr. 26, 2016.

\* cited by examiner

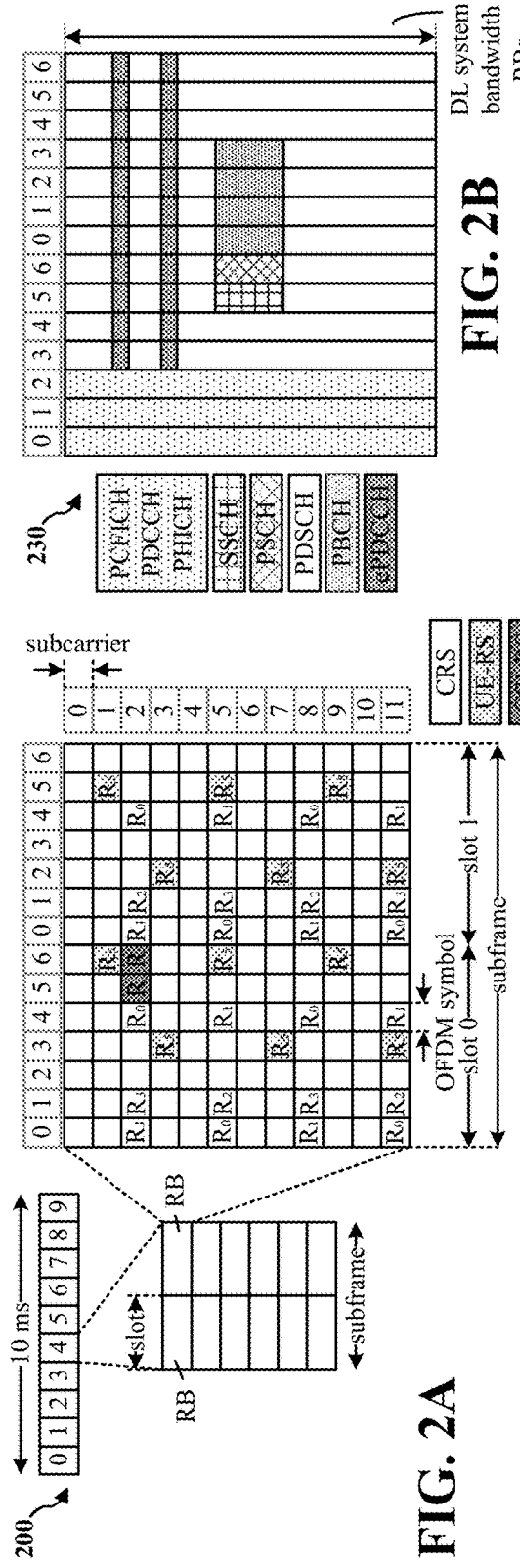
FIG. 2A
FIG. 2B
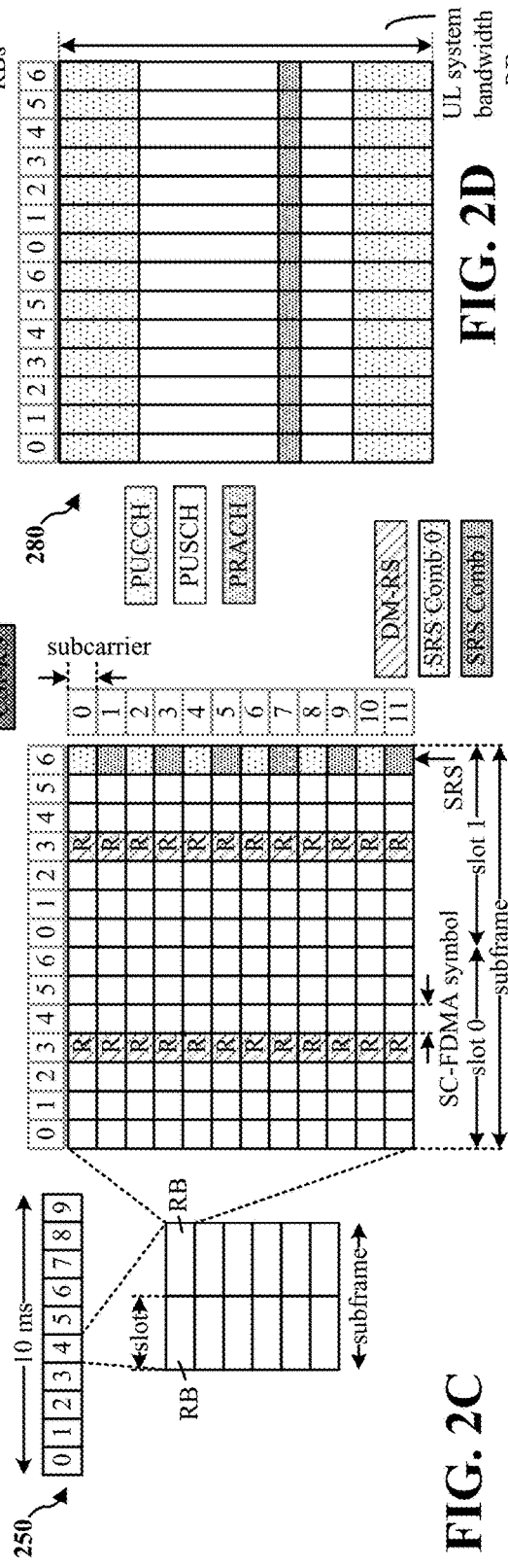
FIG. 2C
FIG. 2D

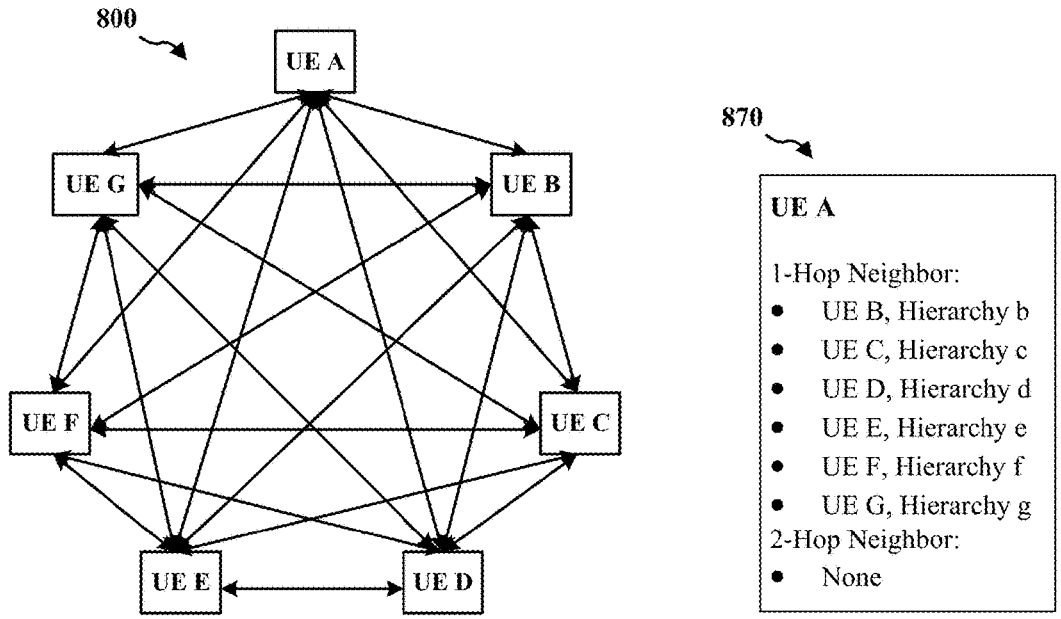
FIG. 8A
FIG. 8C
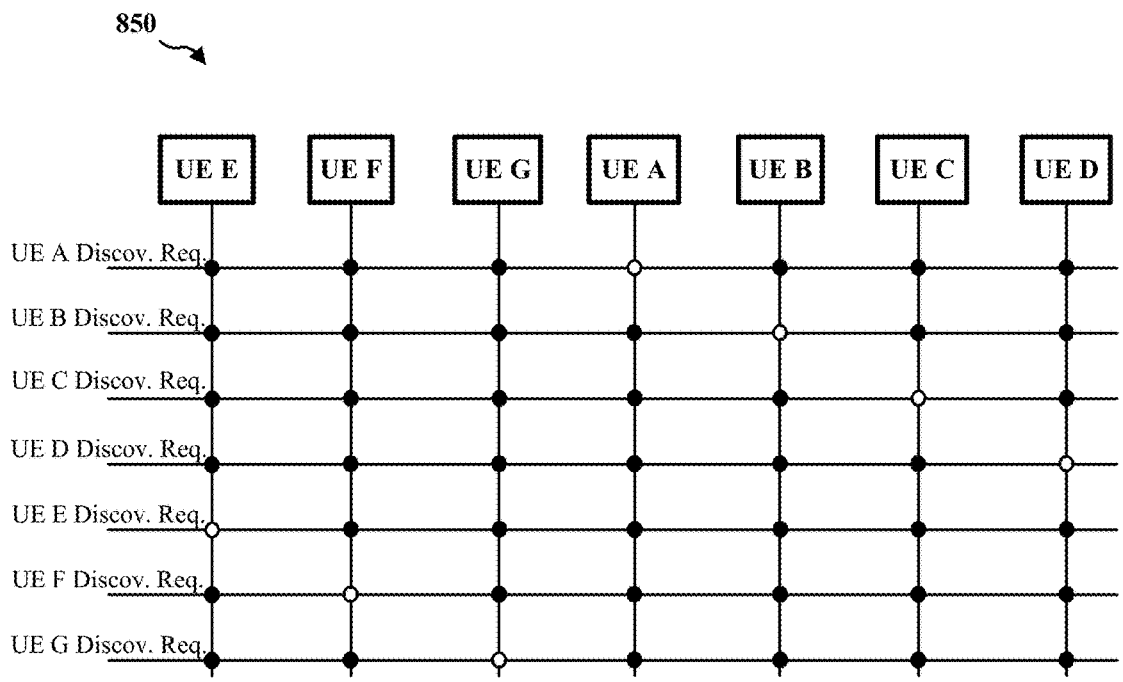
FIG. 8B

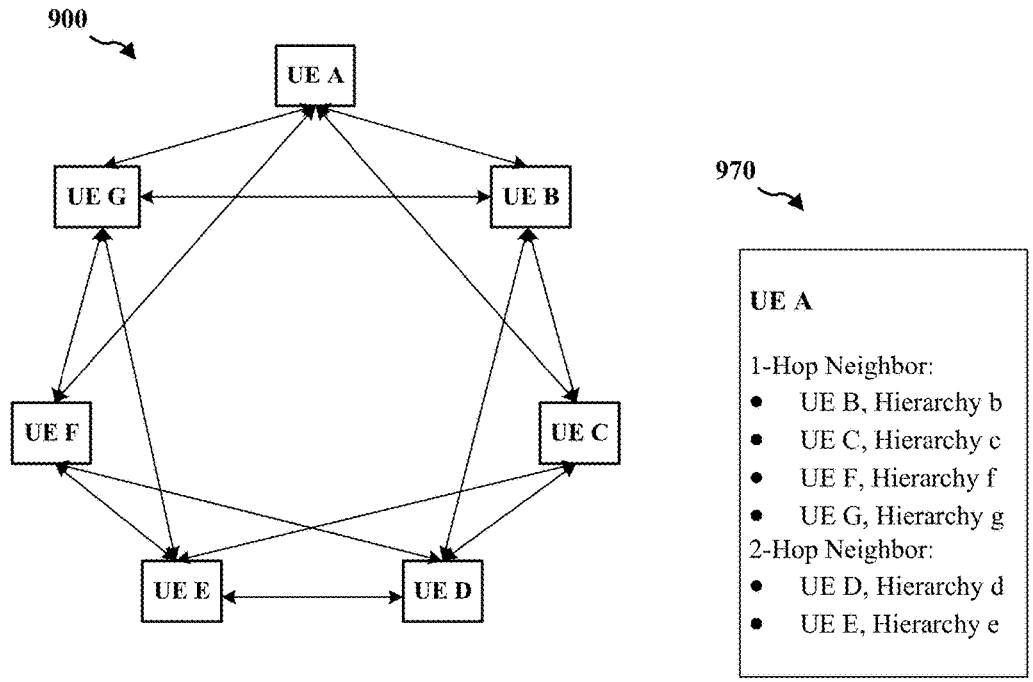
FIG. 9A
FIG. 9C
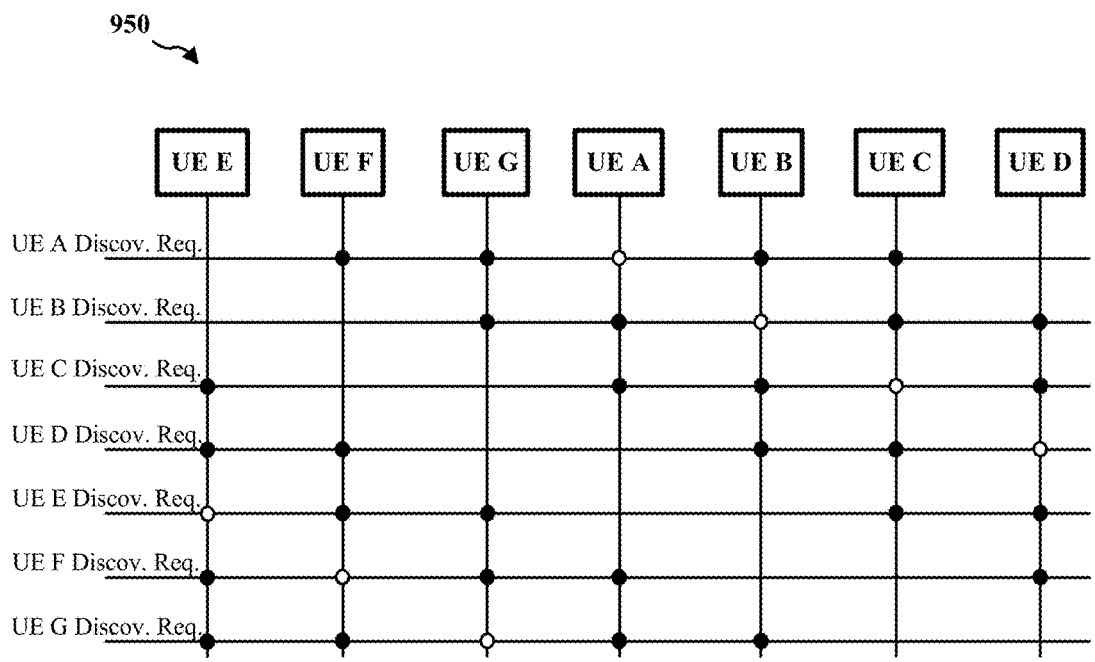
FIG. 9B

UE-TO-UE RELAY LIST AND DETERMINATION OF FLOOR ARBITRATOR

CROSS-REFERENCE TO RELATED APPLICATION(S)

This application claims the benefit of U.S. Provisional Application Ser. No. 62/142,686, entitled "UE-to-UE Relay List and Determination of Floor Arbitrator" and filed on Apr. 3, 2015, which is expressly incorporated by reference herein in its entirety.

BACKGROUND

Field

The present disclosure relates generally to communication systems, and more particularly, to a device discovery and floor control.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In wireless communication, user equipments may be configured to communicate with one another. However, there may be various limitations that prevent efficient communication between user equipments. Therefore, improvements are desired to reduce or eliminate such limitations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) may communicate with other UEs (e.g., neighbor UEs). However, if a UE attempts to communicate with a neighbor UE of the UE's neighbor UE, the UE may experience difficulties with the communication. Therefore, it may be desirable to provide a mechanism where the UE may communicate with a neighbor UE of the UE's neighbor UE by utilizing the UE's neighbor UE as a relay for the communication between the UE and the neighbor UE of the UE's neighbor UE.

In an aspect of the disclosure, a method, a computer program product, and an apparatus are provided. The apparatus may be a first user equipment (UE). The first UE receives a discovery message from a second UE, the discovery message including information about 1-hop neighbor UEs of the second UE. The first UE determines to communicate with a third UE based on the discovery message, the third UE being one of the 1-hop neighbor UEs of the second UE. The first UE requests the second UE to operate as a relay for communication between the first UE and the third UE. The first UE communicates with the third UE through the second UE.

In an aspect, the apparatus may be a first UE. The first UE includes means for receiving a discovery message from a second UE, the discovery message including information about 1-hop neighbor UEs of the second UE. The first UE includes means for determining to communicate with a third UE based on the discovery message, the third UE being one of the 1-hop neighbor UEs of the second UE. The first UE includes means for requesting the second UE to operate as a relay for communication between the first UE and the third UE. The first UE includes means for communicating with the third UE through the second UE.

In an aspect, the apparatus may be a first UE including a memory and at least one processor coupled to the memory. The at least one processor is configured to: receive a discovery message from a second UE, the discovery message including information about 1-hop neighbor UEs of the second UE, determine to communicate with a third UE based on the discovery message, the third UE being one of the 1-hop neighbor UEs of the second UE, request the second UE to operate as a relay for communication between the first UE and the third UE; and communicate with the third UE through the second UE.

In an aspect, a computer-readable medium storing computer executable code for a first UE includes code to: receive a discovery message from a second UE, the discovery message including information about 1-hop neighbor UEs of the second UE, determine to communicate with a third UE based on the discovery message, the third UE being one of the 1-hop neighbor UEs of the second UE, request the second UE to operate as a relay for communication between the first UE and the third UE; and communicate with the third UE through the second UE.

In another aspect of the disclosure, a method, a computer program product, and an apparatus are provided. The apparatus may be a first user equipment (UE). The first UE generates a discovery message including information about 1-hop neighbor UEs of the first UE. The first UE transmits the discovery message to a second UE. The first UE receives a request from the second UE to operate as a relay for communication between the first UE and a third UE, the third UE being one of the 1-hop neighbor UEs of the first UE. The first UE performs a relay function for communication between the first UE and the third UE based on the request.

In an aspect, the apparatus may be a first UE. The first UE includes means for generating a discovery message including information about 1-hop neighbor UEs of the first UE. The first UE includes means for transmitting the discovery message to a second UE. The first UE includes means for receiving a request from the second UE to operate as a relay for communication between the first UE and a third UE, the third UE being one of the 1-hop neighbor UEs of the first UE. The first UE includes means for performing a relay function for communication between the first UE and the third UE based on the request.

In an aspect, the apparatus may be a first UE including a memory and at least one processor coupled to the memory. The at least one processor is configured to: generate a discovery message including information about 1-hop neighbor UEs of the first UE, transmit the discovery message to a second UE, receive a request from the second UE to operate as a relay for communication between the first UE and a third UE, the third UE being one of the 1-hop neighbor UEs of the first UE, and perform a relay function for communication between the first UE and the third UE based on the request.

In an aspect, a computer-readable medium storing computer executable code for a first UE includes code to: generate a discovery message including information about 1-hop neighbor UEs of the first UE, transmit the discovery message to a second UE, receive a request from the second UE to operate as a relay for communication between the first UE and a third UE, the third UE being one of the 1-hop neighbor UEs of the first UE, and perform a relay function for communication between the first UE and the third UE based on the request.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

FIGS. 8A-8C are example diagrams illustrating a full member visibility case.

FIGS. 9A-9C are example diagrams illustrating a partial member visibility case.

DETAILED DESCRIPTION

Figure 1:
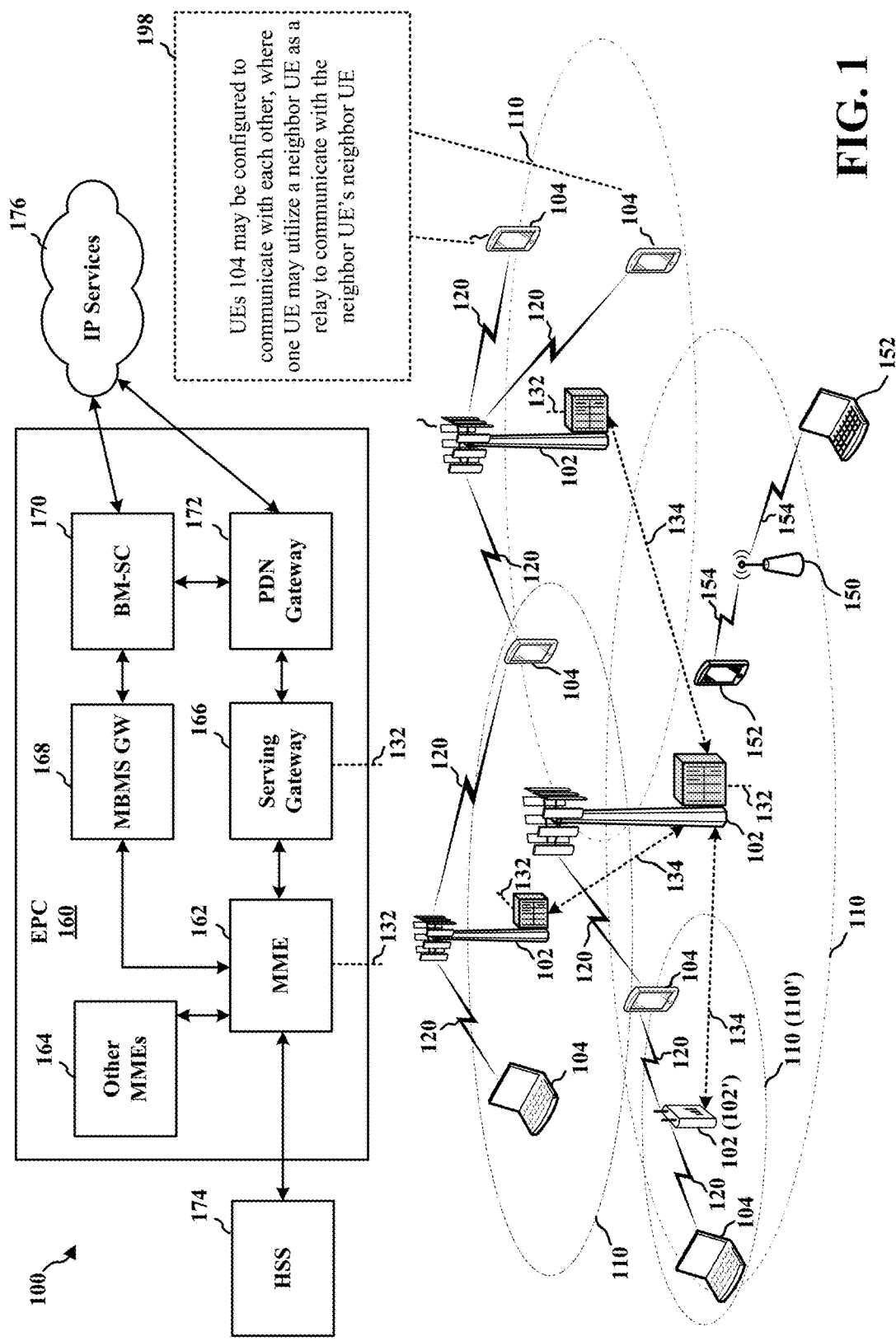
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UEs 104 may be configured to communicate with each other, where one UE may utilize a neighbor UE as a relay to communicate with the neighbor UE's neighbor UE (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
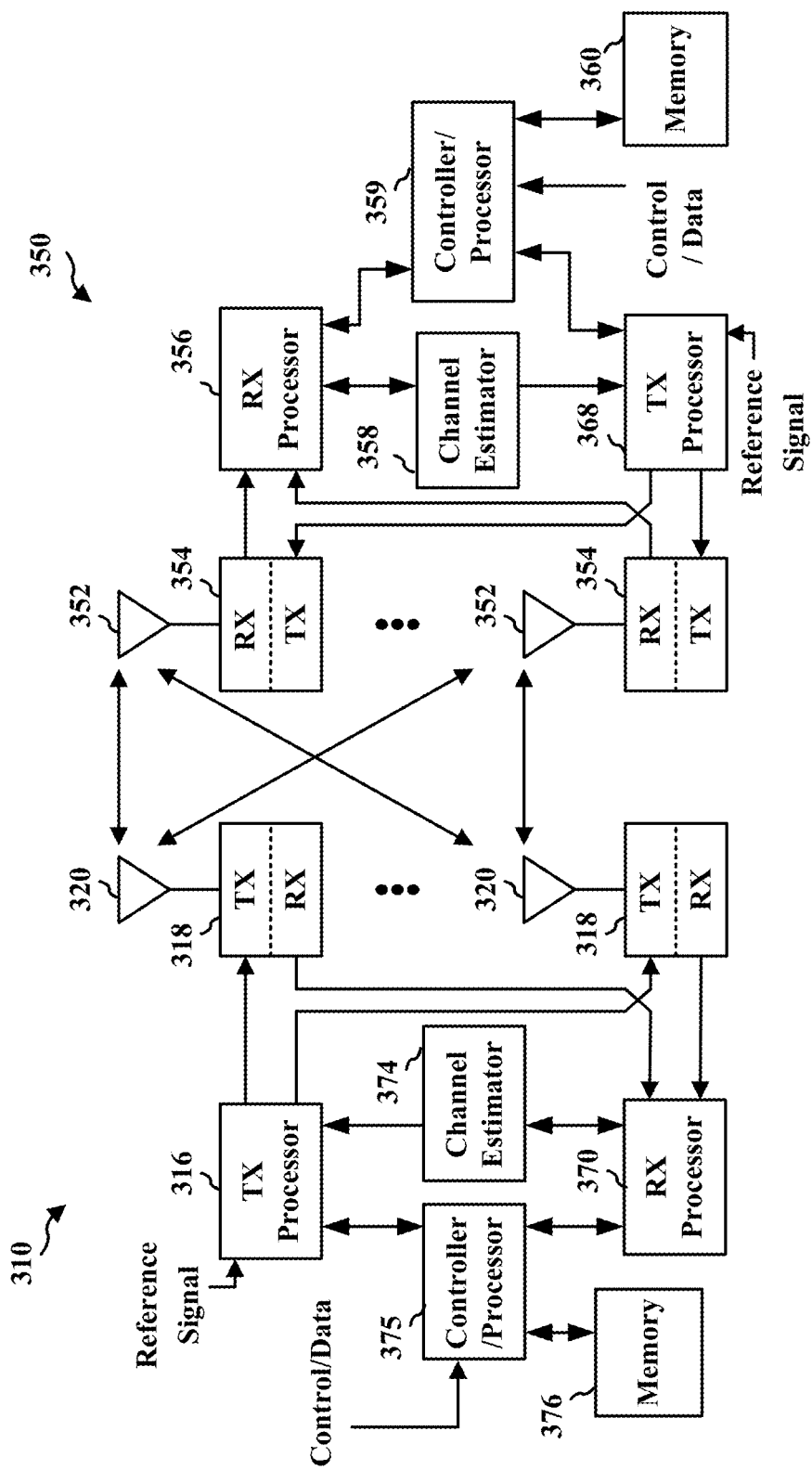
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
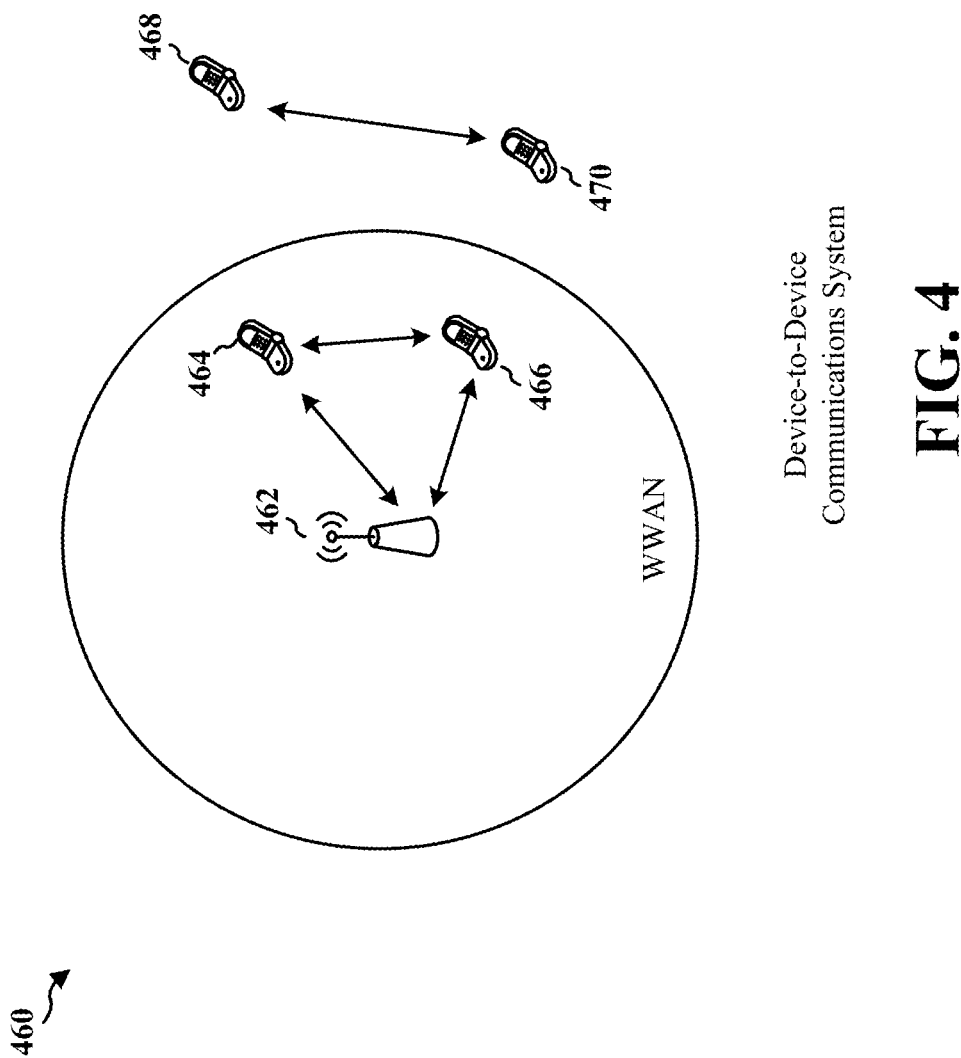
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

A UE may use discovery messages received from neighbor UEs to determine neighbor UEs to perform communication. In particular, proximity service (ProSe) direct discovery message may be used in a Mission Critical Push To Talk (MCPTT) communication to discover the neighbor UEs in order to set up a direct communication with one of the discovered neighbor UEs. For example, the discovery message sent from a neighbor UE may include information about the neighbor UE such that the UE may discover the neighbor UE based on the discovery message. Although such discovery message feature enables the UE to discover and to establish communication with the UE's neighbor UE, the UE may not generally be able to communicate with a neighbor of the UE's neighbor. Therefore, an approach to enable the UE to communicate with the neighbor of the UE's neighbor is desired, especially when the UE cannot directly communicate with the neighbor of the UE's neighbor.

In addition, after the UEs discover each other, the MCPTT communication may be configured either on-network or off-network (peer-to-peer). The discovery mechanism for ProSe/MCPTT may be based on a device-to-device communications system (e.g., the device-to-device communications system 460) in the LTE Direct system. The MCPTT communication may rely on floor arbitration (FA) which is assigned to a UE with highest user hierarchy among the UEs that discovered each other. Therefore, after discovering the UEs, an efficient approach to determine hierarchy information of the UEs and to determine a UE that performs a floor arbitrator function is also desired.

Figure 5:
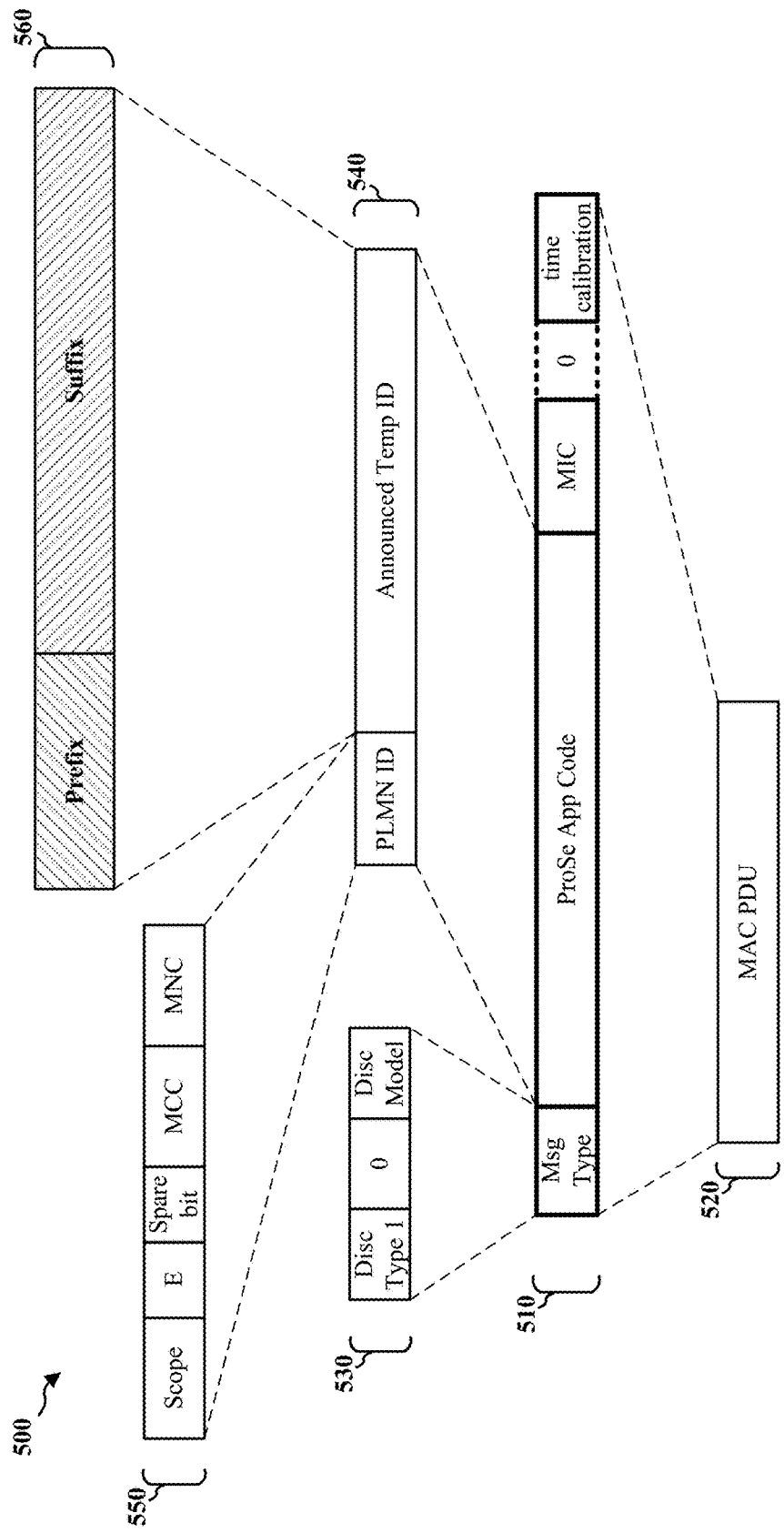
FIG. 5 is an example diagram illustrating a structure of a discovery message.

FIG. 5 is an example diagram 500 illustrating a structure of a discovery message. A discovery message is 510 is included in a media access control protocol data unit (MAC PDU) 520. The discovery message 510 includes a message type field 530 and a proximity service (ProSe) application code field 540. The ProSe application code field 540 includes a public land mobile network identity (PLMN ID) 550 and an announced temporary identifier (ID) 560. The PLMN ID includes four fields, including a scope field, an E-bit field, a spare bit field, a mobile country code (MCC), and a mobile network code (MNC). The announced temporary ID 560 has a prefix portion and a suffix portion. Specific details regarding the announced temporary ID 560 are explained infra.

According to an aspect of the disclosure, the announced temporary ID in a discovery message sent by a sender UE may include information about the sender UE sending the discovery message as well as neighbor UEs (e.g., 1-hop neighbor UEs, 2-hop neighbor UEs, etc.) of the sender UE. Thus, even if a UE cannot discover the neighbor UEs of the sender UE directly, the UE may receive the discovery message from the sender UE and identify the neighbor UEs of the sender UE based on the discovery message from the sender UE, such that the UE may communicate with the neighbor UEs of the sender UE via the sender UE (and any intermediate UE) operating as a relay. For example, the UE may request the sender UE to operate as a relay such that the UE may communicate with one or more neighbor UEs of the sender UE via the sender UE. The announced temporary ID in the discovery message may also include hierarchy information of the sender UE as well as hierarchy information of the neighbor UEs of the sender UE. It is noted that the hierarchy information may be used in floor arbitration. In particular, the hierarchy information may be monitored such that a UE with the highest hierarchy number is selected as a floor arbitrator. If a UE assigned as a floor arbitrator becomes unavailable (e.g., during a group communication among UEs), a UE with the next highest hierarchy number is selected as a floor arbitrator. It is also noted that the hierarchy information for each UE may be updated by a network (e.g., due to changes in a UE profile), and the network may inform the updated hierarchy information when the UE is on the network. The information in the announced temporary ID may be encoded for security. The encoded information in the announced temporary ID may be decoded by a UE having a security key. For example, each UE that belongs to the same group as the sender UE may have the security key and an ID identifying the group that are used to decode the encoded information in the announced temporary ID.

Figure 6:
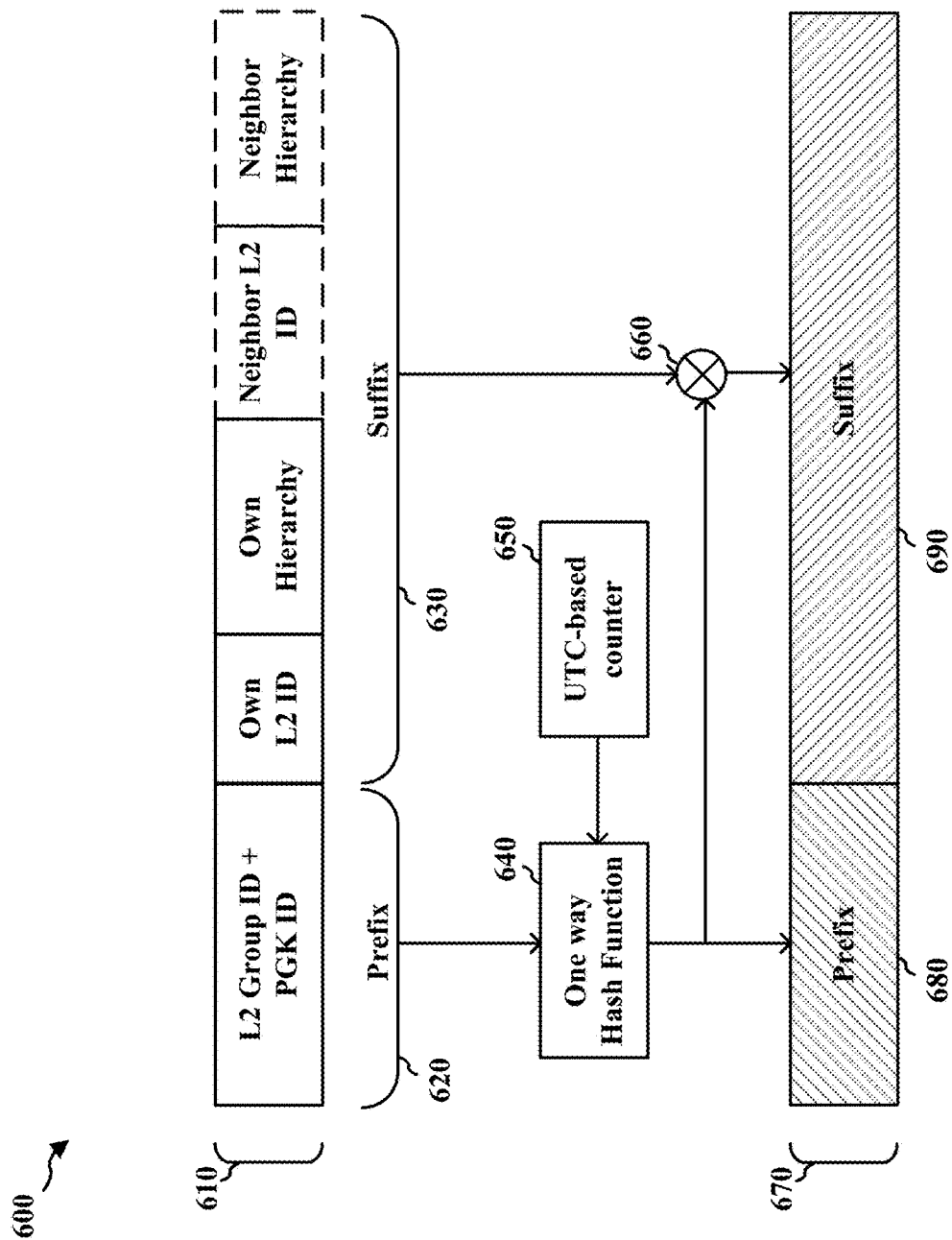
FIG. 6 is an example diagram illustrating generation of an announced temporary ID, according to an aspect of the disclosure.

FIG. 6 is an example diagram 600 illustrating generation of an announced temporary ID, according to an aspect of the disclosure. For example, a temporary ID 610 may be made secure by encoding the temporary ID 610 to generate an announced temporary ID. A UE may generate a temporary ID 610 including a prefix portion 620 and a suffix portion 630. The prefix portion 620 may include a group ID such as a layer-2 (L2) group ID and a group key ID such as ProSe group key ID (PGK ID). The suffix portion 630 includes the UE's own ID (e.g., L2 ID), the UE's own hierarchy, IDs (e.g., L2 IDs) of the UE's neighbor UEs, and hierarchy values of the UE's neighbor UEs. It is noted that the values for the IDs of the UE's neighbor UEs and hierarchy values of the UE's neighbor UEs are set to zero if no neighbor UEs of the UE is identified. The UE applies a one-way hash function 640 to encode the group ID and the group key ID in the prefix portion 620, based on a universal time coordinated (UTC) based counter 650. The UTC-based counter 650 has the same system time that is used in open discovery. The prefix portion 680 is generated by encoding the group ID and the group key ID based on the one-way hash function 640 and the UTC-based counter 650. A portion of the output from the one-way hash function 640 is combined with the suffix portion 630 by an XOR operation 660 to generate a suffix portion 690 of the announced temporary ID 670. Thus, the announced temporary ID 670 includes a restricted prefix portion 680 and an open-in-nature suffix portion 690. A monitoring UE that receives a discovery message including the announced temporary ID 670 may attempt to decode the prefix portion 680 first. If the monitoring UE has the same group ID and the same group key ID as the group ID and the group key ID of the prefix portion 620 of the temporary ID 610, the monitoring UE will be able to decode the prefix portion 680 of the announced temporary ID 670 generated by the UE. Subsequently, the monitoring UE may decode the suffix portion 690 of the announced temporary ID 670, for example, by performing an XOR operation with the suffix portion 690 and a portion of an output of a one-way hash function of the group ID and the group key ID. Thus, the suffix is decoded via a similar XOR operation to the XOR operation 660.

It is noted that a UE may not be able to include all of IDs of neighbor UEs and hierarchy information of the neighbor UEs in the discovery message due to size limitation of the temporary ID. Thus, at least one of the following approaches may be utilized to address such issue. According to a first approach, a UE may select a certain number of neighbor UEs and their hierarchy information to be included in the discovery message, where the selection is based on the signal strength of the neighbor UEs and/or the hierarchy numbers of the neighbor UEs. According to a second approach, a UE may send different discovery messages, where the discovery messages include information about different sets of neighbor UEs and their hierarchy information. For example, a first discovery message may include information about a first set of neighbor UEs and their hierarchy information and a second discovery message may include information about a second set of neighbor UEs and their hierarchy information, where the first and second sets cover the entire neighbor UEs. According to a third approach, the UE may generate a group communication message to indicate one or more neighbor UEs, where the group communication is separate from the discovery message. The group communication message may not have the size limitation that the temporary ID of the discovery message has. The discovery message may include information to indicate when and/or where (which frequency band) the group communication message is sent, such that the UE receiving the discovery message does not need to constantly listen for the group communication message.

Figure 7:
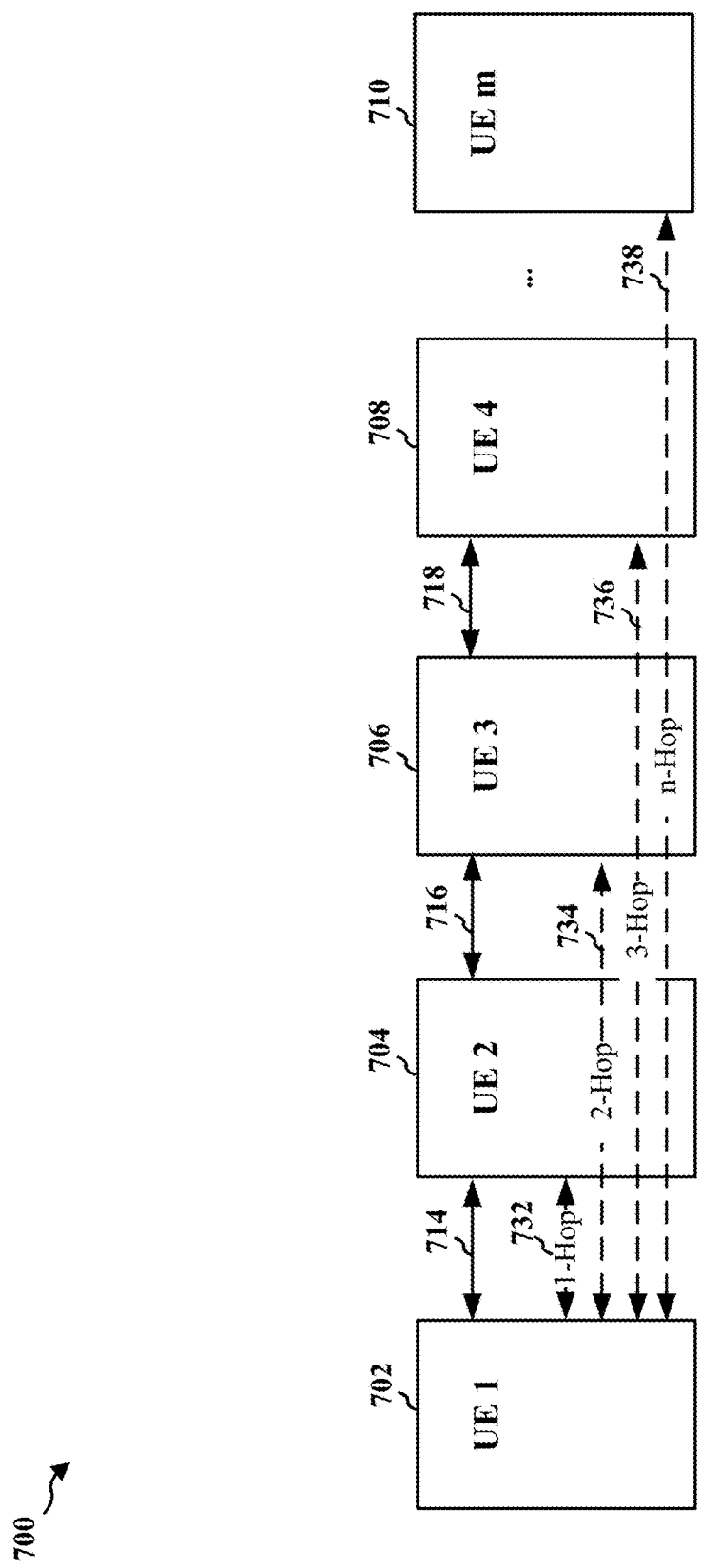
FIG. 7 is an example diagram illustrating a user equipment communicating with other user equipments, according to an aspect of the disclosure.

FIG. 7 is an example diagram 700 illustrating a user equipment communicating with other user equipments, according to an aspect of the disclosure. In the example diagram 700, there are n UEs (e.g., a first UE 702, a second UE 704, a third UE 706, . . . an $m^{th}$ UE 710) in a same group. In the example diagram 700, each UE may discover an adjacent UE. Thus, the first UE 702 may discover the second UE 704, the second UE 704 may discover the first UE 702 and the third UE 706, and the third UE 706 may discover the second UE 704 and the fourth UE 708, and so on. If the first UE 702 may be configured to discover a 1-hop neighbor through n-hop neighbor of the first UE 702. The number of hops indicates a number of connections between UEs that the first UE 702 may utilize to communicate with another UE. For example, the second UE 704 is a 1-hop neighbor UE of the first UE 702 because the first UE 702 uses one UE connection (714) to communicate with the second UE 704. For example, the third UE 706 is a 2-hop neighbor UE of the first UE 702 because the first UE 702 uses two UE connections (714 and 716) to communicate with the third UE 706 through the second UE 704, at 734. For example, the fourth UE 708 is a 3-hop neighbor UE of the first UE 702 because the first UE 702 uses three UE connections (714, 716, 718) to communicate with the third UE 706 through the second UE 704 and the third UE 706, at 736. For example, the $m^{th}$ UE 708 is an n-hop neighbor UE of the first UE 702 because the first UE 702 uses n UE connections to communicate with the $m^{th}$ UE 708 through n UEs (e.g., the second UE 704, the third UE 706, the fourth UE 708 . . . , (m−1)th UE), at 738, where n=m−1.

One or more UEs may generate a discovery message to be sent to a neighbor UE. For example, the second UE 704 may generate a discovery message, and send the discovery message to the first UE 702. The discovery message generated by the second UE 704 may include a temporary ID, where a prefix of the temporary ID may include a group ID and a group key ID of the second UE 704 and a suffix portion of the temporary ID may include the ID of the second UE 704 itself, hierarchy information of the second UE 704, and an ID and hierarchy information of a 1-hop neighbor UE of the second UE 704. In one aspect, the suffix portion of the temporary ID in the discovery message generated by the second UE 704 may additionally include an ID and hierarchy information of a 2-hop neighbor UE of the second UE 804 (a neighbor UE of the second UE's neighbor UE). In one aspect, the suffix portion of the temporary ID in the discovery message generated by the second UE 704 may include IDs and hierarchy information of the second UE 704 and up to (n−1)-hop neighbor UEs.

The first UE 702 may receive a discovery message from the second UE 704. Based on the discovery message from the second UE 704, the first UE 702 may determine to communicate with one or more of UEs (the third UE 706, the fourth UE 708 . . . , (m−1)th UE) via the second UE 704 operating as a relay. In an aspect, upon such determination to communicate, the first UE 702 may request the second UE 704 to operate as a relay for the communication. In one example, if the discovery message includes information (e.g., IDs, hierarchy information) about the second UE 704 and the third UE 706 that is a neighbor UE of the second UE 704, the first UE 702 may communicate with the third UE 706 through the second UE 704, at 732, based on the discovery message from the second UE 704. In another example, if the discovery message may include information (e.g., IDs, hierarchy information) about the second UE 704, the third UE 706, and the fourth UE 708, the first UE 702 may communicate with the fourth UE 708 through the second UE 704 and the third UE 706, at 736, based on the discovery message from the second UE 704. In this example, upon determination to communicate with the fourth UE 708, the first UE 702 may request the second UE 704 and the third UE 706 to operate as relays for the communication with the fourth UE 708. Similarly, in another example, if the discovery message includes information (e.g., IDs, hierarchy information) about the second UE through (m−1)th UE, then the first UE 702 may communicate with the $m^{th}$ UE 710 through the second UE 704 through (m−1)th UE, at 738, based on the discovery message from the second UE 704.

FIGS. 8A-8C are example diagrams illustrating a full member visibility case. FIG. 8A is an example diagram 800 illustrating the full member visibility between UEs in a group. In the example diagram 800, there are seven UEs in the same group, including UE A, UE B, UE C, UE D, UE E, UE F, and UE G. Each of the UEs can discover all of other UEs. For example, UE A may discover UE B, UE C, UE D, UE E, UE F, and UE G by receiving discovery messages from the respective UEs.

FIG. 8B is an example diagram 850 illustrating communication of a discovery message in the full member visibility case. In each line in the example diagram 850, a white dot represents transmission of a discovery message by a UE and a solid dot represents reception of the discovery message by a neighbor UE. When UE A sends a discovery message (UE A discovery request) to its neighbor UEs, the discovery message may be received by all neighbor UEs including UE B, UE C, UE D, UE E, UE F, and UE G. When UE B sends a discovery message (UE B discovery request) to its neighbor UEs, the discovery message may be received by all neighbor UEs including UE A, UE C, UE D, UE E, UE F, and UE G. When UE C sends a discovery message (UE C discovery request) to its neighbor UEs, the discovery message may be received by all neighbor UEs including UE A, UE B, UE D, UE E, UE F, and UE G. When UE D sends a discovery message (UE D discovery request) to its neighbor UEs, the discovery message may be received by all neighbor UEs including UE A, UE B, UE C, UE E, UE F, and UE G. When UE E sends a discovery message (UE E discovery request) to its neighbor UEs, the discovery message may be received by all neighbor UEs including UE A, UE B, UE C, UE D, UE F, and UE G. When UE F sends a discovery message (UE F discovery request) to its neighbor UEs, the discovery message may be received by all neighbor UEs including UE A, UE B, UE C, UE D, UE E, and UE G. When UE G sends a discovery message (UE G discovery request) to its neighbor UEs, the discovery message may be received by all neighbor UEs including UE A, UE B, UE C, UE D, UE E, and UE F. Thus, in the example diagrams 800 and 850, each of the UEs is a 1-hop neighbor of other UEs and can be discovered by any of other UEs.

FIG. 8C illustrates an example visibility list 870 in the partial member visibility case. The example visibility list 870 is the visibility list of UE A in the partial member visibility case. For example, UE A has 1-hop neighbor UEs including UE B, UE C, UE D, UE E, UE F, and UE G. It is noted that the visibility list may include hierarchy information of the 1-hop neighbors. UE A may maintain this visibility list and may periodically update the visibility list because a discovery message sent to UE A periodically may change over time.

FIGS. 9A-9C are example diagrams illustrating a partial member visibility case. FIG. 9A is an example diagram 900 illustrating the partial member visibility between UEs in a group. In the example diagram 900, there are seven UEs in the same group, including UE A, UE B, UE C, UE D, UE E, UE F, and UE G. In the example diagram 900, each of the UEs can discover four of other UEs. For example, UE A may discover UE B, UE C, UE F, and UE G by receiving discovery messages from the respective UEs. The UE A does not receive discovery messages from UE E or UE D.

FIG. 9B is an example diagram 950 illustrating communication of a discovery message in the partial member visibility case. In each line in the example diagram 950, a white dot represents transmission of a discovery message by a UE and a solid dot represents reception of the discovery message by a neighbor UE. When UE A sends a discovery message (UE A discovery request) to its neighbor UEs, the discovery message may be received by UE B, UE C, UE F and UE G. When UE B sends a discovery message (UE B discovery request) to its neighbor UEs, the discovery message may be received by UE A, UE C, UE D and UE G. When UE C sends a discovery message (UE C discovery request) to its neighbor UEs, the discovery message may be received by UE A, UE B, UE D and UE E. When UE D sends a discovery message (UE D discovery request) to its neighbor UEs, the discovery message may be received by UE B, UE C, UE E and UE F. When UE E sends a discovery message (UE E discovery request) to its neighbor UEs, the discovery message may be received by UE C, UE D, UE F and UE G. When UE F sends a discovery message (UE F discovery request) to its neighbor UEs, the discovery message may be received by UE A, UE D, UE E and UE G. When UE G sends a discovery message (UE G discovery request) to its neighbor UEs, the discovery message may be received by UE A, UE B, UE E and UE F.

The example diagram 950 also illustrates that UE A may receive discovery messages sent from UE B, UE C, UE F and UE G, respectively. The UE B may receive discovery messages sent from UE A, UE C, UE D and UE G, respectively. The UE C may receive discovery messages sent from UE A, UE B, UE D and UE E, respectively. UE D may receive discovery messages sent from UE B, UE C, UE E and UE F. UE E may receive discovery messages sent from UE C, UE D, UE F and UE G, respectively. UE F may receive discovery messages sent from UE A, UE D, UE E and UE G, respectively. UE G may receive discovery messages sent from UE A, UE B, UE E and UE F, respectively. Thus, in the example diagram 950, each UE has four 1-hop neighbor UEs that can be discovered directly by receiving discovery messages from the respective 1-hop neighbor UEs. Further, in the example diagram 950, each UE may have two 2-hop neighbor UEs that can be discovered by receiving a discovery message from a 1-hop neighbor UE.

FIG. 9C illustrates an example visibility list 970 in the partial member visibility case. The example visibility list 970 is the visibility list of UE A in the partial member visibility case. For example, UE A has 1-hop neighbor UEs including UE B, UE C, UE F, and UE G. UE A may discover UE D based on a discovery message received from UE B or UE C or UE F. Because any one of UE B, UE C, and UE F can discover UE D, a discovery message from UE B or UE C or UE F includes information about UE D, which may be used by UE A to discover UE D. Further, because any one of UE C, UE F, and UE G can discover UE E, a discovery message from UE C or UE F or UE G includes information about UE E, which can be used by UE A to discover UE E. UE D and UE E are 2-hop neighbors of UE A because UE A may discover UE D and/or UE E via another UE operating as a relay. It is noted that the visibility list may include hierarchy information of the 1-hop neighbors and 2-hop neighbors. UE A may maintain this visibility list and may periodically update the visibility list because a discovery message sent to UE A periodically may change over time.

Figure 10A:
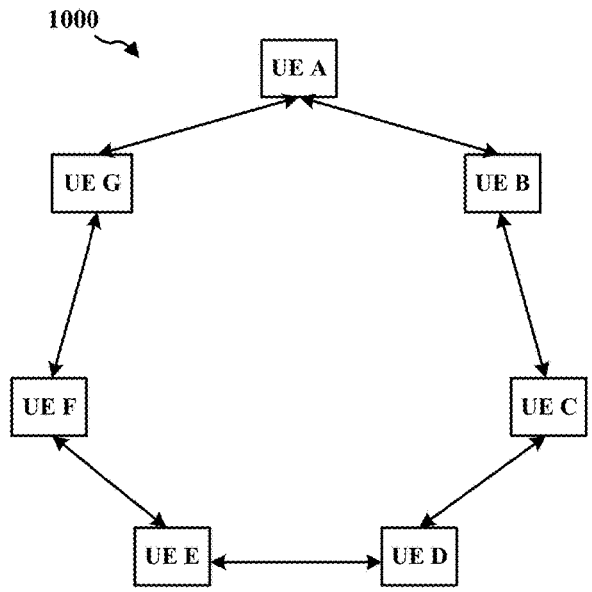
FIGS. 10A-10C are example diagrams illustrating a limited member visibility case.
Figure 10C:
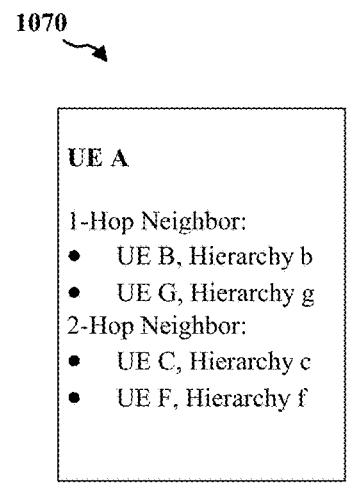
Figure 10B:
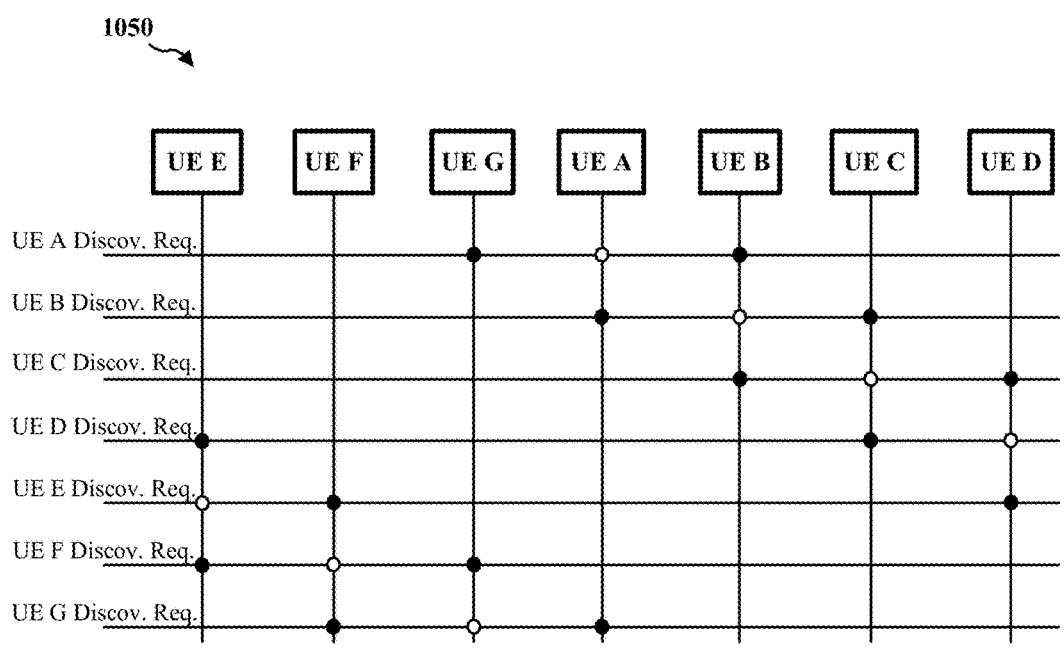

FIGS. 10A-10C are example diagrams illustrating a limited member visibility case. FIG. 10A is an example diagram 1000 illustrating the limited member visibility between UEs in a group. In the example diagram 1000, there are seven UEs in the same group, including UE A, UE B, UE C, UE D, UE E, UE F, and UE G. In the example diagram 1000, each of the UEs can discover two of other UEs. For example, UE A may discover UE B and UE G by receiving discovery messages from the respective UEs. The UE A does not receive discovery messages from UE C, UE D, UE E or UE F.

FIG. 10B is an example diagram 1050 illustrating communication of a discovery message in the limited member visibility case. In each line in the example diagram 1050, a white dot represents transmission of a discovery message by a UE and a solid dot represents reception of the discovery message by a neighbor UE. When UE A sends a discovery message (UE A discovery request) to its neighbor UEs, the discovery message may be received by UE B and UE G. When UE B sends a discovery message (UE B discovery request) to its neighbor UEs, the discovery message may be received by UE A, and UE C. When UE C sends a discovery message (UE C discovery request) to its neighbor UEs, the discovery message may be received by UE B and UE D. When UE D sends a discovery message (UE D discovery request) to its neighbor UEs, the discovery message may be received by UE C and UE E. When UE E sends a discovery message (UE E discovery request) to its neighbor UEs, the discovery message may be received by UE D and UE F. When UE F sends a discovery message (UE F discovery request) to its neighbor UEs, the discovery message may be received by UE E and UE G. When UE G sends a discovery message (UE G discovery request) to its neighbor UEs, the discovery message may be received by UE A and UE F.

The example diagram 1050 also illustrates that UE A may receive discovery messages sent from UE B and UE G, respectively. The UE B may receive discovery messages sent from UE A and UE C, respectively. The UE C may receive discovery messages sent from UE B and UE D, respectively. UE D may receive discovery messages sent from UE C and UE E. UE E may receive discovery messages sent from UE D and UE F, respectively. UE F may receive discovery messages sent from UE E and UE G, respectively. UE G may receive discovery messages sent from UE A and UE F, respectively. Thus, in the example diagram 1050, each UE has two 1-hop neighbor UEs that can be discovered directly by receiving discovery messages from the respective 1-hop neighbor UEs. Further, in the example diagram 1050, each UE may have two 2-hop neighbor UEs that can be discovered by receiving a discovery message from a 1-hop neighbor UE.

FIG. 10C illustrates an example visibility list 1070 in the partial member visibility case. The example visibility list 1070 is the visibility list of UE A in the partial member visibility case. The visibility list 1070 may be constantly updated by UE A. For example, UE A has 1-hop neighbor UEs including UE B, UE C, UE F, and UE G. UE A may discover UE D based on a discovery message received from UE B or UE C or UE F. Because any one of UE B, UE C, and UE F can discover UE D, a discovery message from UE B or UE C or UE F includes information about UE D. Because the UE A may discover and communicate with UE D via another UE operating as a relay, UE D is 2-hop neighbor of UE A. UE A may maintain this visibility list and may periodically update the visibility list because a discovery message sent to UE A periodically may change over time.

Although the above examples illustrate a UE discovering the UE's 1-hop neighbors and 2-hop neighbors, in an aspect, the UE may be further configured to discover n-hop neighbors in addition to 1-hop neighbors and 2-hop neighbors, and their corresponding hierarchy information. Referring to the examples illustrated in FIGS. 10A-10C, if the UE is configured to discover up to n-hop neighbors, UE-A may receive a discovery message from its 1-hop neighbor, where the discovery message includes IDs of 1-hop neighbor, IDs of 2-hop neighbors, IDs of 3-hop neighbor, IDs of 4-hop neighbors, . . . IDs of n-hop neighbors, and their hierarchy information. Thus, for example, in the examples illustrated in FIGS. 10A-10C, if the UE is configured to discover up to 3-hop neighbors, UE A may receive a discovery message from UE B, where the discovery message includes IDs of UE-B (1-hop neighbor), UE-C (2-hop neighbor), and UE-D (3-hop neighbor) and their hierarchy information. In particular, the UE-B may determine the ID of UE D (and an ID of UE C) and corresponding hierarchy information via UE C (e.g., by receiving a discovery message from UE C), such that the UE may generate and send a discovery message including IDs of UE C and UE D as well as the ID of UE B.

It is noted that a visibility list (e.g., the visibility lists 870, 970, 1070) may be utilized for floor arbitration. In particular, because a UE lists other UEs that the UE may communicate with in the visibility list and corresponding hierarchy information, the UE may determine a floor arbitrator based on the visibility list. For example, in the visibility list 870 of FIG. 8, if hierarchy d has the highest number among hierarchy numbers in the visibility list 870, UE A may determine that UE D corresponding to hierarchy d is a floor arbitrator. Details of a floor arbitration procedure are further provided infra.

In an aspect, a model for floor control (e.g., off-network floor control) has two elements: a floor arbitrator that is a floor chair and a floor control server combined, and floor participants (e.g., other UEs that are not the floor arbitrator). A UE with the highest hierarchy value is selected as the floor arbitrator. In one example, a UE may select one of the sender UE and the sender UE's neighbor UEs as the floor arbitrator. The floor arbitrator may grant communication floor to a UE such that the UE with the floor grant may perform group communication with other UEs in the group. Thus, a UE may send a floor request to the floor arbitrator to obtain a grant for group communication with other UEs. This floor control mechanism is based on sending UDP/IP packets to a certain port number. This port is preconfigured and negotiated at the time of session set up for the group communication. The group communication can be monitored by all the UEs within the group. The floor arbitrator and other UEs in the group maintain a list (floor control list) of the floor requests made to the floor arbitrator and the floor arbitrator's responses for the floor control. The floor arbitrator maintains this floor control list to handle the floor control based on the UE's position in the queue for the communication floor, hierarchies, etc. Some other UEs maintain this floor control list to have a copy of the floor control list that the floor arbitrator has in case the floor arbitrator becomes unavailable (e.g., loses coverage or drops off), and a new floor arbitrator should be assigned. For example, at least some of the UEs with higher hierarchy values may maintain this floor control list. It is noted that hierarchy information is already determined while the UEs discover each other during a discovery phase discussed above, thus may not be shared by the UDP/IP packets.

Figure 11:
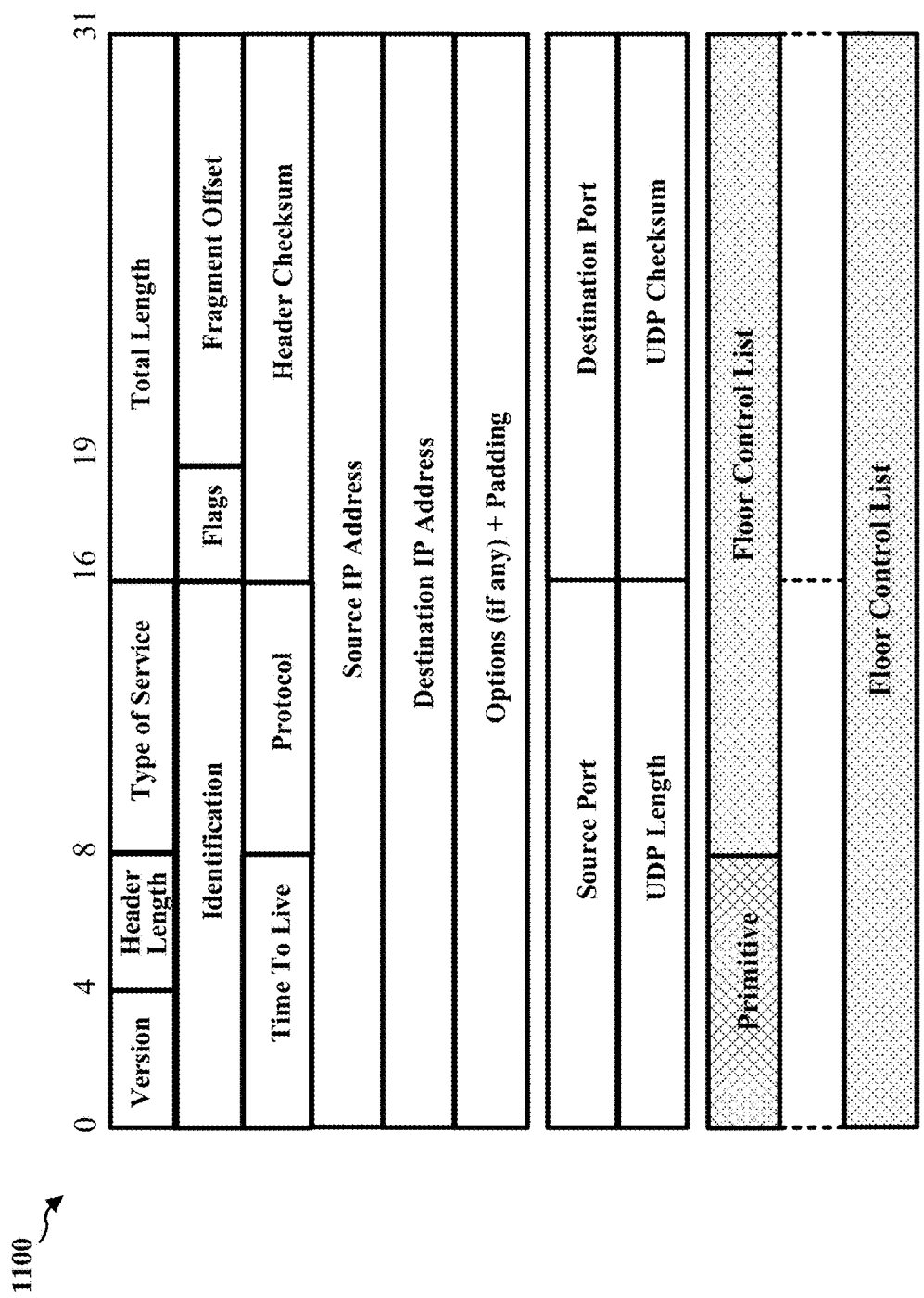
FIG. 11 is an example diagram illustrating a structure of a packet for floor control.

FIG. 11 is an example diagram 1100 illustrating a structure of a UDP/IP packet for floor control. The UDP/IP packet 1100 includes a certain port number and a certain destination port number for communication. The UDP/IP packet 1100 also includes a primitive and a floor control list. The primitive may be an 8-bit value. Floor participants and a floor arbitrator use a set of primitives to communicate with each other. The primitives are further shown in Table 1.

TABLE 1

| | Primitives | |
|---|---|---|
| Value | Primitive | Direction |
| 1 | FloorRequest | P -> S |
| 2 | FloorRelease | P -> S |
| 3 | FloorRequestQuery | P -> S; Ch -> S |
| 4 | FloorRequestStatus | P <- S; Ch <- S |
| 5 | UserQuery | P -> S; Ch -> S |
| 6 | UserStatus | P <- S; Ch <- S |
| 7 | FloorQuery | P -> S; Ch -> S |
| 8 | FloorStatus | P <- S; Ch <- S |
| 9 | ChairAction | Ch -> S |
| 10 | ChairActionAck | Ch <- S |
| 11 | Hello | P -> S; Ch -> S |
| 12 | HelloAck | P <- S; Ch <- S |
| 13 | Error | P <- S; Ch <- S |

Table 1 shows primitive for different values and corresponding directions, where "S" stands for Floor Control Server, "P" stands for Floor Participant, and "Ch" stands for Floor Chair. The Floor Control List contains the status of the floor control procedures and may be communicated depending on the values for the primitive.

Figure 12:
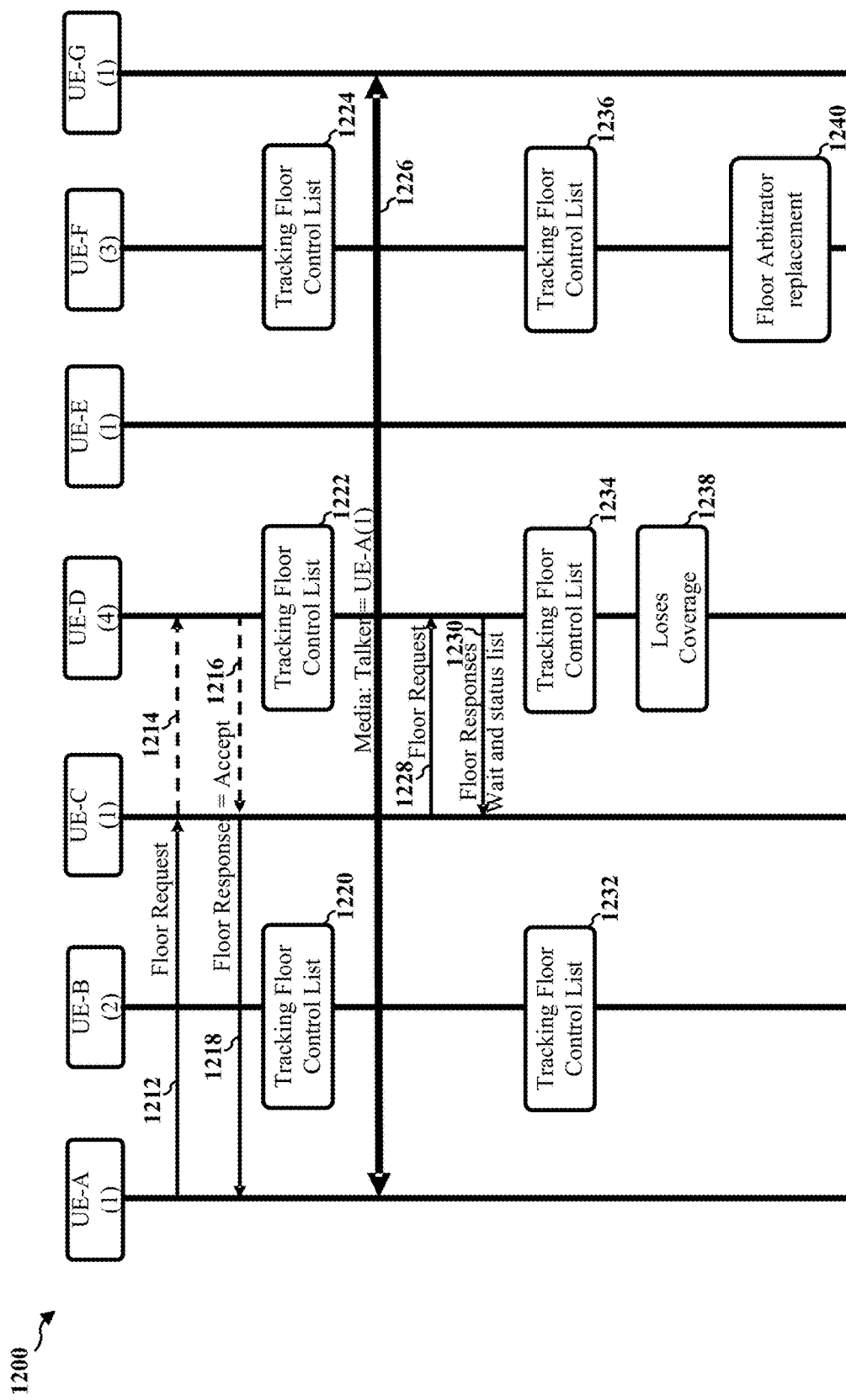
FIG. 12 is an example flow diagram illustrating floor control signaling.

FIG. 12 is an example flow diagram 1200 illustrating floor control signaling. The floor control request will be sent in a communication channel for group communication. The floor control request is sent from a UE to a floor arbitrator. The floor arbitrator may be determined based on the information obtained from discovery messages that are sent from neighbor UEs. As discussed supra, the UE determines the floor arbitrator based on the hierarchy information of the UE's neighbor UEs and/or signal strength of the neighbor UEs. The example flow diagram 1200 shows interaction between group members UE-A, UE-B, UE-C, UE-D, UE-E, UE-F, and UE G, with hierarchy values 1, 2, 1, 4, 1, 3, 1, respectively, as shown in parenthesis. Because UE-D has the highest hierarchy value among the group members, UE-A determines that UE-D is a floor arbitrator. Similarly to the example of FIGS. 9A-9C, UE-C may be a 1-hop neighbor of UE-A, as well as a 1-hop neighbor of UE-D, while UE-D may be a 2-hop neighbor of UE-A. Thus, UE-A may communicate to UE-D via UE-C operating as a relay. At 1212, in order to obtain a floor, the UE-A sends a floor request to UE-C, such that the UE-C may perform a relay function to relay the floor request from UE-A to UE-D at 1214. At 1216, the UE-D responds to the floor request by sending a floor response indicating acceptance of the floor request to UE-C, which subsequently relays the floor response to UE-A at 1218. The UEs with higher hierarchy values may build respective floor control lists. In particular, in the example diagram 1200, UE-B, UE-D, and UE-F have the higher hierarchy values (2, 4, and 3 respectively) than the other UEs. Thus, UE-B, UE-D, and UE-F build respective floor control lists at 1220, 1222, and 1224, respectively. At 1226, after obtaining the floor, UE-A performs group communication (e.g., media) with the group members based on the floor. While UE-A performs the group communication based on the floor, another UE may attempt to obtain the floor.

At 1228, while UE-A performs the group communication based on the floor, UE-C sends a floor request to UE-D. In response, at 1230, UE-D sends a floor response indicating the UE-C to wait, because the floor is utilized by UE-A. UE-B, at 1232, 1234, and 1236, UE-B, UE-D, and UE-F build respective floor control lists, respectively. At 1238, UE-D may lose coverage and become unavailable. If the UE-D becomes unavailable, a new floor arbitrator is determined (e.g., by UE-A) based on hierarchy information. At 1240, UE-F becomes a new floor arbitrator because UE-F has the highest hierarchy value among the available UEs after the UE-D becomes unavailable. When UE-F becomes the new floor arbitrator, UE-F may continue the operation of the floor arbitrator based on the floor control list that is constantly maintained.

Figure 13:
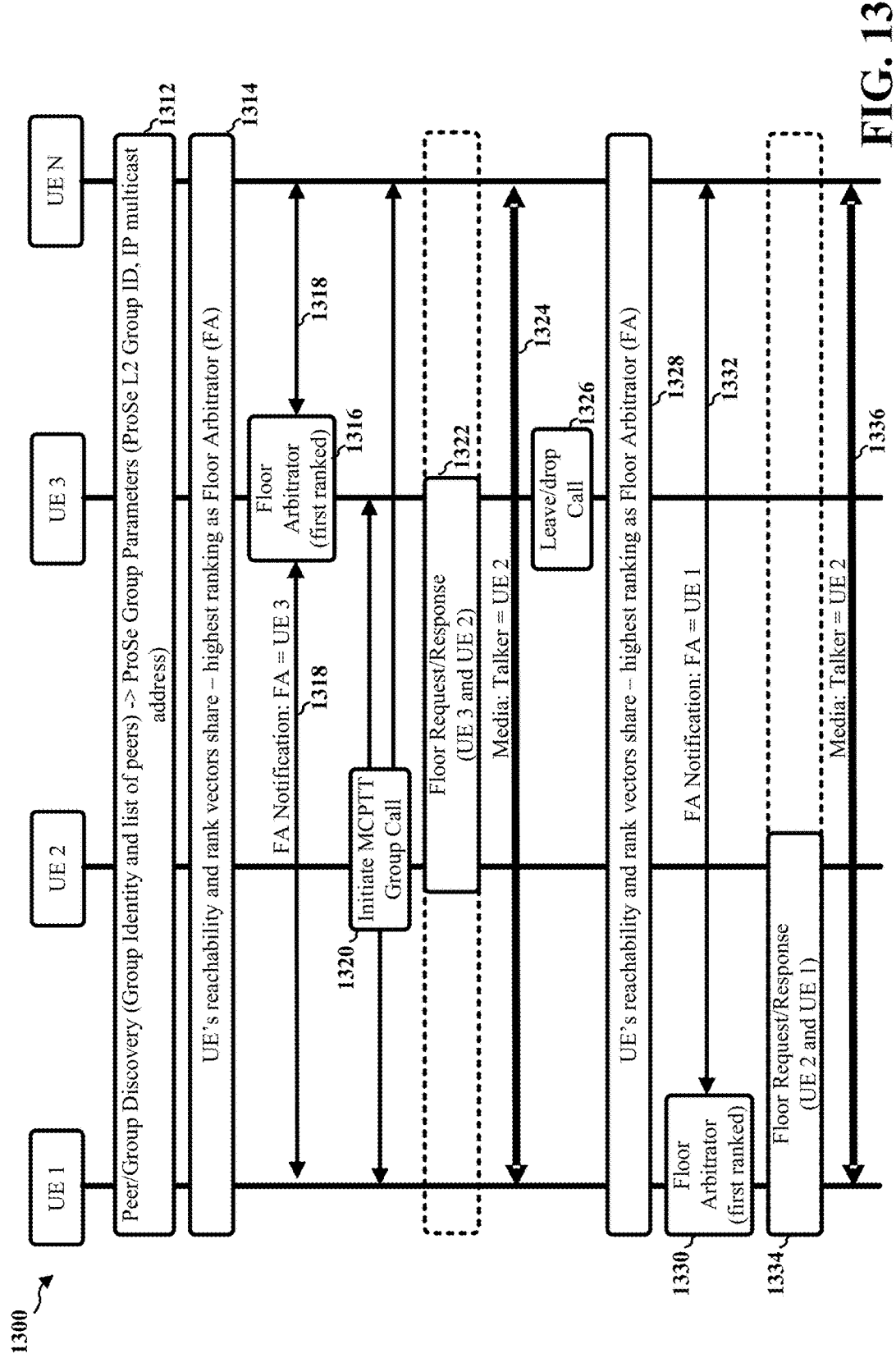
FIG. 13 is an example flow diagram illustrating rank-based floor arbitration.

FIG. 13 is an example flow diagram 1300 illustrating rank-based floor arbitration. The example flow diagram 1300 illustrates a scenario where floor requests from multiple UEs are sent to a floor arbitrator, and the floor arbitrator's responds to the requests (e.g., based on ranking). In particular, the floor arbitrator may determine which UE should be granted a floor based on the ranking of each UE, wherein the ranking is determined based on hierarchy information. At 1312, the UEs (UE1 through UE N) in the same group perform peer discovery by transmitting and receiving discovery messages, and may also determine hierarchy information of neighbor UEs. At 1314, the UEs share the UE's reachability information (e.g., whether a UE is a 1-hop neighbor or a 2-hop neighbor or n-hop neighbor) and ranking based on the hierarchy information among the UEs, and determine that a UE with the highest ranking (e.g., corresponding to a highest hierarchy value) is a floor arbitrator. Thus, at 1316, UE 3 having the highest ranking becomes the floor arbitrator, and UE 3 sends a notification to other UEs notifying that UE 3 is the floor arbitrator at 1318. At 1320, UE 2 initiates a group communication with other UEs. To perform the group communication, the UE 2 sends a floor request to UE 3 and receives a floor response from UE 3 granting the floor, at 1322. When UE 2 obtains the floor based on the floor response, the UE 2 performs group communication with other UEs at 1324.

At 1326, UE 3 becomes unavailable, and thus becomes unavailable as a floor arbitrator. At 1328, upon UE 3 becoming unavailable as the floor arbitrator, the UEs share the UE's reachability information and ranking based on the hierarchy information among the UEs, and determine that a UE with the highest ranking is a floor arbitrator. With UE 3 being unavailable, UE 1 has the highest ranking. Thus, at 1330, UE 1 becomes a new floor arbitrator, and UE 1 sends a notification to other UEs notifying that UE 1 is the new floor arbitrator at 1332. For UE 2 continue the group communication, the UE 2 sends a floor request to UE 1 that is the new arbitrator and receives a floor response from UE 1 granting the floor, at 1334. When UE 2 obtains the floor based on the floor response, the UE 2 continues to perform group communication with other UEs at 1336.

Figure 14:
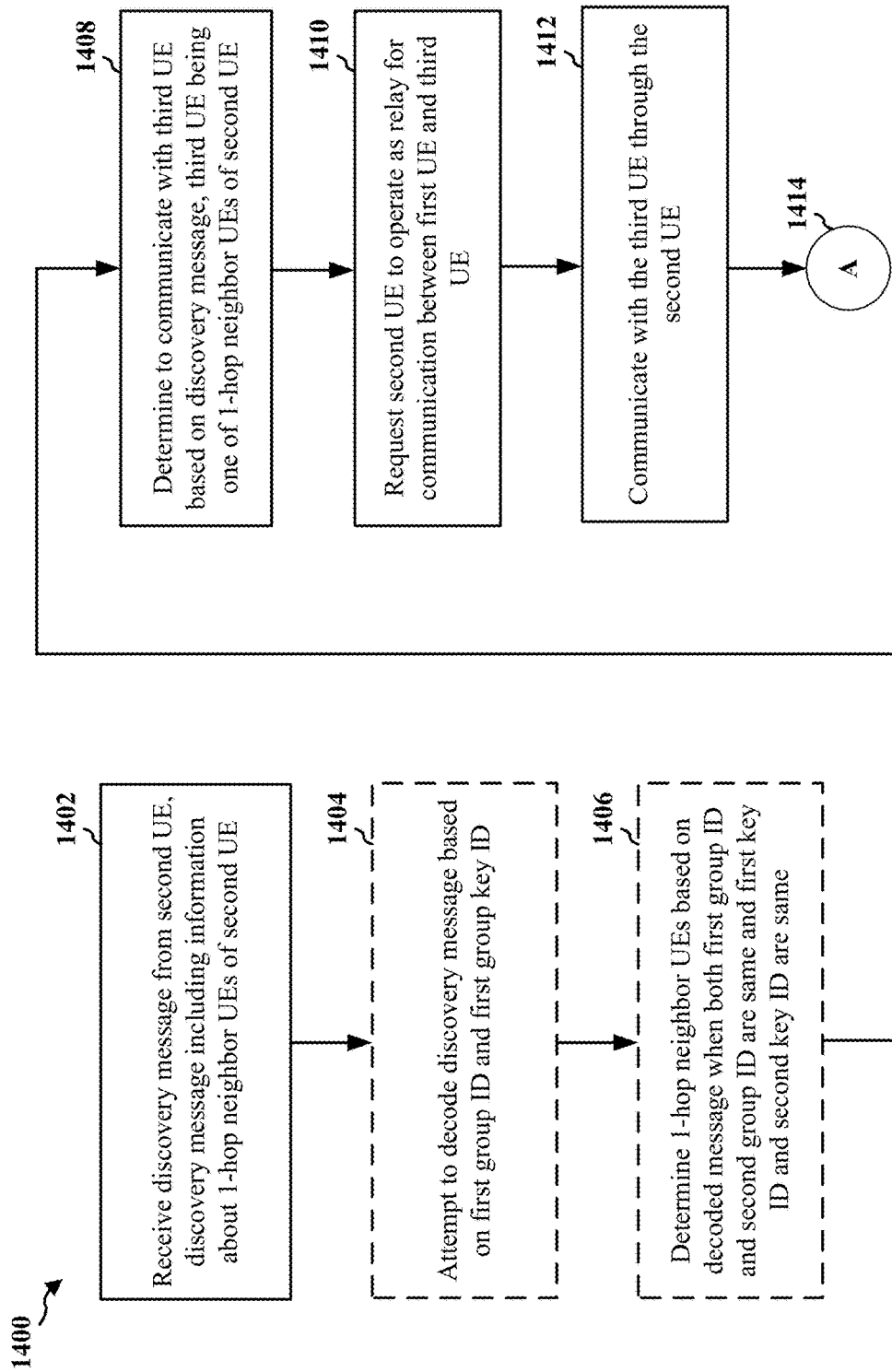
FIG. 14 is a flowchart of a method of wireless communication, according to an aspect of the disclosure.

FIG. 14 is a flowchart 1400 of a method of wireless communication, according to an aspect of the disclosure. The method may be performed by a first UE (e.g., the UE 464, the apparatus 1802/1802'). At 1402, a first UE receives a discovery message from a second UE, the discovery message including information about 1-hop neighbor UEs of the second UE. In an aspect, the first UE may have a first group ID and a first group key ID, and the discovery message includes a second group ID and a second group key ID. For example, as discussed supra, the second UE 704 may generate a discovery message, and send the discovery message to the first UE 702. For example, as discussed supra, the discovery message generated by the second UE 704 may include a temporary ID, where a prefix of the temporary ID may include a group ID and a group key ID of the second UE 704 and a suffix portion of the temporary ID may include the ID of the second UE 704 itself, hierarchy information of the second UE 704, and an ID and hierarchy information of a 1-hop neighbor UE of the second UE 704. At 1404, the first UE may attempt to decode the discovery message based on the first group ID and the first group key ID. For example, as discussed supra, each UE that belongs to the same group as the sender UE may have the security key and an ID identifying the group that are used to decode the encoded information in the announced temporary ID included in the discovery message.

At 1406, the first UE may determine the 1-hop neighbor UEs based on the decoded discovery message when both the first group ID and the second group ID are the same and the first group key ID and the second group key ID are the same. For example, as discussed supra, if the monitoring UE has the same group ID and the same group key ID as the group ID and the group key ID of the prefix portion 620 of the temporary ID 610, the monitoring UE will be able to decode the prefix portion 680 of the announced temporary ID 670 generated by the UE. In an aspect, the discovery message includes a temporary ID that includes a prefix portion and a suffix portion, the prefix portion includes the second group ID and the second group key ID, and the suffix portion includes at least one identifier indicating said 1-hop neighbor UEs of the second UE. In an aspect, the first group ID is a first layer-2 group ID, and the first group key ID is a first PGK ID. In an aspect, the suffix portion further includes an ID of the second UE, hierarchy information of the second UE, and hierarchy information of the 1-hop neighbor UEs of the second UE. For example, as discussed supra, A UE may generate a temporary ID 610 including a prefix portion 620 and a suffix portion 630. For example, as discussed supra, the prefix portion 620 may include a group ID such as a layer-2 (L2) group ID and a group key ID such as ProSe group key ID (PGK ID). The suffix portion 630 includes the UE's own ID (e.g., L2 ID), the UE's own hierarchy, IDs (e.g., L2 IDs) of the UE's neighbor UEs, and hierarchy values of the UE's neighbor UEs. In an aspect, the prefix portion and the suffix portion are encoded based on a hash function, the second group ID, and the second group key ID. For example, as discussed supra, the UE applies a one-way hash function 640 to encode the group ID and the group key ID in the prefix portion 620, based on a UTC based counter 650.

At 1408, the first UE determines to communicate with a third UE based on the discovery message, the third UE being one of the 1-hop neighbor UEs of the second UE. For example, as discussed supra, based on the discovery message from the second UE 704, the first UE 702 may determine to communicate with one or more of UEs (the third UE 706, the fourth UE 708 . . . , (m–1)th UE) via the second UE 704 operating as a relay. At 1410, the first UE requests the second UE to operate as a relay for communication between the first UE and the third UE. For example, as discussed supra, upon such determination to communicate, the first UE 702 may request the second UE 704 to operate as a relay for the communication. At 1412, the first UE communicates with the third UE through the second UE. For example, as discussed supra, if the discovery message includes information (e.g., IDs, hierarchy information) about the second UE 704 and the third UE 706 that is a neighbor UE of the second UE 704, the first UE 702 may communicate with the third UE 706 through the second UE 704. At 1414, additional method features may be performed, as explained infra.

Figure 15:
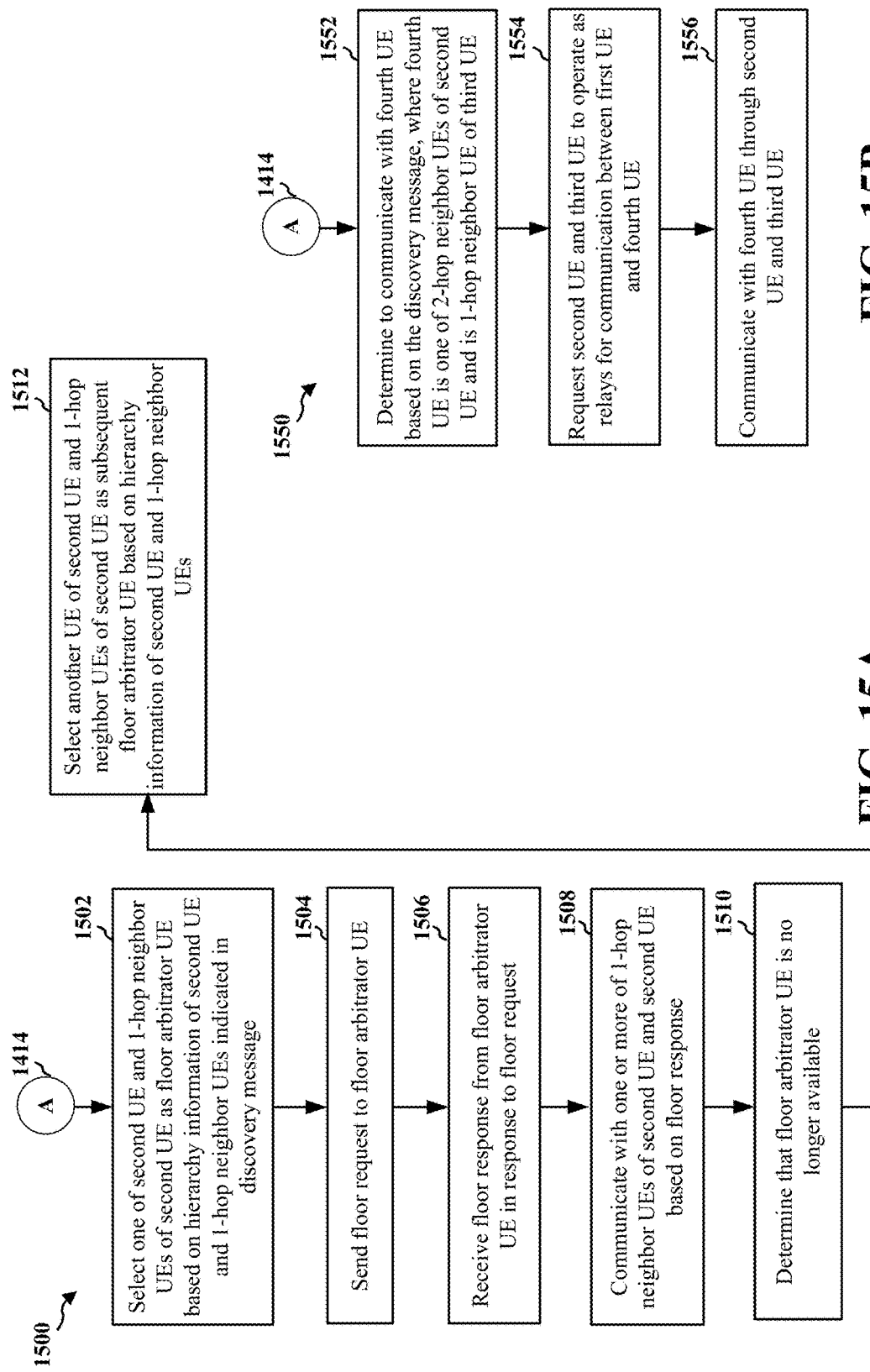
FIG. 15A is a flowchart of a method of wireless communication, expanding from the flowchart of FIG. 14.
FIG. 15B is a flowchart of a method of wireless communication, expanding from the flowchart of FIG. 14.

FIG. 15A is a flowchart 1500 of a method of wireless communication, expanding from the flowchart 1400 of FIG. 14. The method may be performed by a first UE (e.g., the UE 464, the apparatus 1802/1802'). At 1414, the method features may be expanded from the flowchart 1300 of FIG. 13. At 1502, the first UE selects one of the second UE and the 1-hop neighbor UEs of the second UE as a floor arbitrator UE based on hierarchy information of the second UE and 1-hop neighbor UEs indicated in the discovery message. For example, as discussed supra, a UE may select one of the sender UE and the sender UE's neighbor UEs as the floor arbitrator.

At 1504, the first UE sends a floor request to the floor arbitrator UE. For example, as discussed supra, a UE may send a floor request to the floor arbitrator to obtain a grant for group communication with other UEs. For example, referring to FIG. 12, at 1212, in order to obtain a floor, the UE-A sends a floor request to UE-C, such that the UE-C may perform a relay function to relay the floor request from UE-A to UE-D at 1214. At 1506, the first UE receives a floor response from the floor arbitrator UE in response to the floor request. For example, referring to FIG. 12, at 1216, the UE-D responds to the floor request by sending a floor response indicating acceptance of the floor request to UE-C, which subsequently relays the floor response to UE-A at 1218. At 1508, the first UE communicates with one or more of the 1-hop neighbor UEs of the second UE and the second UE based on the floor response. For example, referring to FIG. 12, at 1226, after obtaining the floor, UE-A performs group communication (e.g., media) with the group members based on the floor. In an aspect, the floor arbitrator UE has a highest hierarchy value among the second UE and 1-hop neighbor UEs indicated in the discovery message based on the hierarchy information. In an aspect, if the third UE is selected as the floor arbitrator UE, the second UE operates as a relay for communication of the floor request and the floor response between the first UE and the third UE. For example, referring to FIG. 12, at 1212, in order to obtain a floor, the UE-A sends a floor request to UE-C, such that the UE-C may perform a relay function to relay the floor request from UE-A to UE-D at 1214. For example, referring to FIG. 12, at 1216, the UE-D responds to the floor request by sending a floor response indicating acceptance of the floor request to UE-C, which subsequently relays the floor response to UE-A at 1218.

At 1510, the first UE may determine that the floor arbitrator UE is no longer available. At 1512, the first UE may select another UE of the second UE and the 1-hop neighbor UEs of the second UE as a subsequent floor arbitrator UE based on the hierarchy information of the second UE and 1-hop neighbor UEs. For example, as discussed supra, if the UE-D becomes unavailable, a new floor arbitrator is determined (e.g., by UE-A) based on hierarchy information. In an aspect, the another UE of the second UE and the 1-hop neighbor UEs of the second UE as a subsequent floor arbitrator is selected as the subsequent floor arbitrator based on a floor control list, wherein the floor control list includes a status of a floor control procedure. For example, as discussed supra, some other UEs maintain this floor control list to have a copy of the floor control list that the floor arbitrator has in case the floor arbitrator becomes unavailable (e.g., loses coverage or drops off), and a new floor arbitrator should be assigned.

FIG. 15B is a flowchart 1550 of a method of wireless communication, expanding from the flowchart 1400 of FIG. 14. The method may be performed by a first UE (e.g., the UE 464, the apparatus 1802/1802'). At 1414, the method features may be expanded from the flowchart 1400 of FIG. 14. In an aspect, the discovery message further includes 2-hop neighbor UEs of the second UE. For example, as discussed supra, the suffix portion of the temporary ID in the discovery message generated by the second UE 704 may additionally include an ID and hierarchy information of a 2-hop neighbor UE of the second UE 804 (a neighbor UE of the second UE's neighbor UE). At 1552, the first UE determines to communicate with a fourth UE based on the discovery message, wherein the fourth UE is one of the 2-hop neighbor UEs of the second UE and is a 1-hop neighbor UE of the third UE. At 1554, the first UE requests the second UE and the third UE to operate as relays for communication between the first UE and the fourth UE. At 1556, the first UE communicates with the fourth UE through the second UE and the third UE. For example, as discussed supra, if the discovery message may include information (e.g., IDs, hierarchy information) about the second UE 704, the third UE 706, and the fourth UE 708, the first UE 702 may communicate with the fourth UE 708 through the second UE 704 and the third UE 706, at 736, based on the discovery message from the second UE 704. For example, as discussed supra, upon determination to communicate with the fourth UE 708, the first UE 702 may request the second UE 704 and the third UE 706 to operate as relays for the communication with the fourth UE 708.

Figure 16:
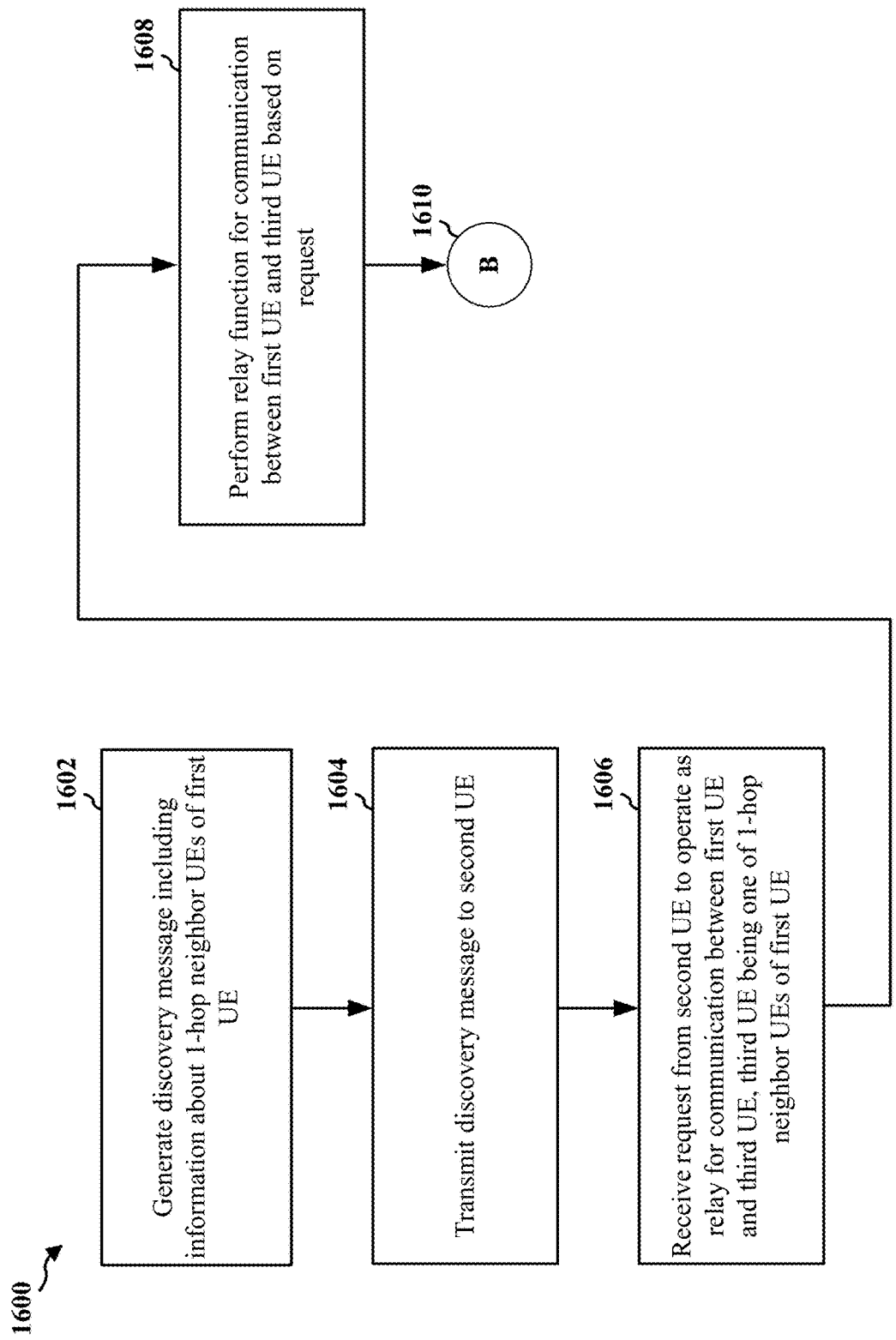
FIG. 16 is a flowchart of a method of wireless communication, according to an aspect of the disclosure.

FIG. 16 is a flowchart 1600 of a method of wireless communication, according to an aspect of the disclosure. The method may be performed by a UE (e.g., the UE 464, the apparatus 1802/1802'). At 1602, the first UE generates a discovery message including information about 1-hop neighbor UEs of the first UE. At 1604, the first UE transmits the discovery message to a second UE. For example, as discussed supra, the second UE 704 may generate a discovery message, and send the discovery message to the first UE 702.

At 1606, the first UE receives a request from the second UE to operate as a relay for communication between the first UE and a third UE, the third UE being one of the 1-hop neighbor UEs of the first UE. For example, as discussed supra, upon such determination to communicate, the first UE 702 may request the second UE 704 to operate as a relay for the communication. At 1608, the first UE performs a relay function for communication between the first UE and the third UE based on the request. For example, as discussed supra, if the discovery message includes information (e.g., IDs, hierarchy information) about the second UE 704 and the third UE 706 that is a neighbor UE of the second UE 704, the first UE 702 may communicate with the third UE 706 through the second UE 704.

In an aspect, the first UE generates the discovery message by encoding the discovery message by applying a hash function to a group ID and a group key ID that are included in the discovery message, where the group ID and the group key ID are known to UEs that are in a same group as the first UE. For example, as discussed supra, the UE applies a one-way hash function 640 to encode the group ID and the group key ID in the prefix portion 620, based on a universal time coordinated (UTC) based counter 650. In such an aspect, the discovery message includes a temporary ID that includes a prefix portion and a suffix portion, the prefix portion includes the group ID and the group key ID, and the suffix portion includes at least one identifier indicating said 1-hop neighbor UEs of the second UE. In such an aspect, the group ID is a layer-2 group ID, and the group key ID is a PGK ID. In such an aspect, the suffix portion further includes an ID of the first UE, hierarchy information of the first UE, and hierarchy information of the 1-hop neighbor UEs of the first UE. For example, as discussed supra, a UE may generate a temporary ID 610 including a prefix portion 620 and a suffix portion 630. For example, as discussed supra, the prefix portion 620 may include a group ID such as a layer-2 (L2) group ID and a group key ID such as ProSe group key ID (PGK ID). For example, as discussed supra, the suffix portion 630 includes the UE's own ID (e.g., L2 ID), the UE's own hierarchy, IDs (e.g., L2 IDs) of the UE's neighbor UEs, and hierarchy values of the UE's neighbor UEs.

In an aspect, the first UE generates the discovery message by selecting one or more of the 1-hop neighbor UEs to be indicated in the discovery message based on at least one of hierarchies of the 1-hop neighbor UEs or signal strength of the 1-hop neighbor UEs, and generating the discovery message including information about the selected one or more of the 1-hop neighbor UEs. For example, as discussed supra, a UE may select a certain number of neighbor UEs and their hierarchy information to be included in the discovery message, where the selection is based on the signal strength of the neighbor UEs and/or the hierarchy numbers of the neighbor UEs.

At 1610, additional method features may be performed, as explained infra.

Figure 17:
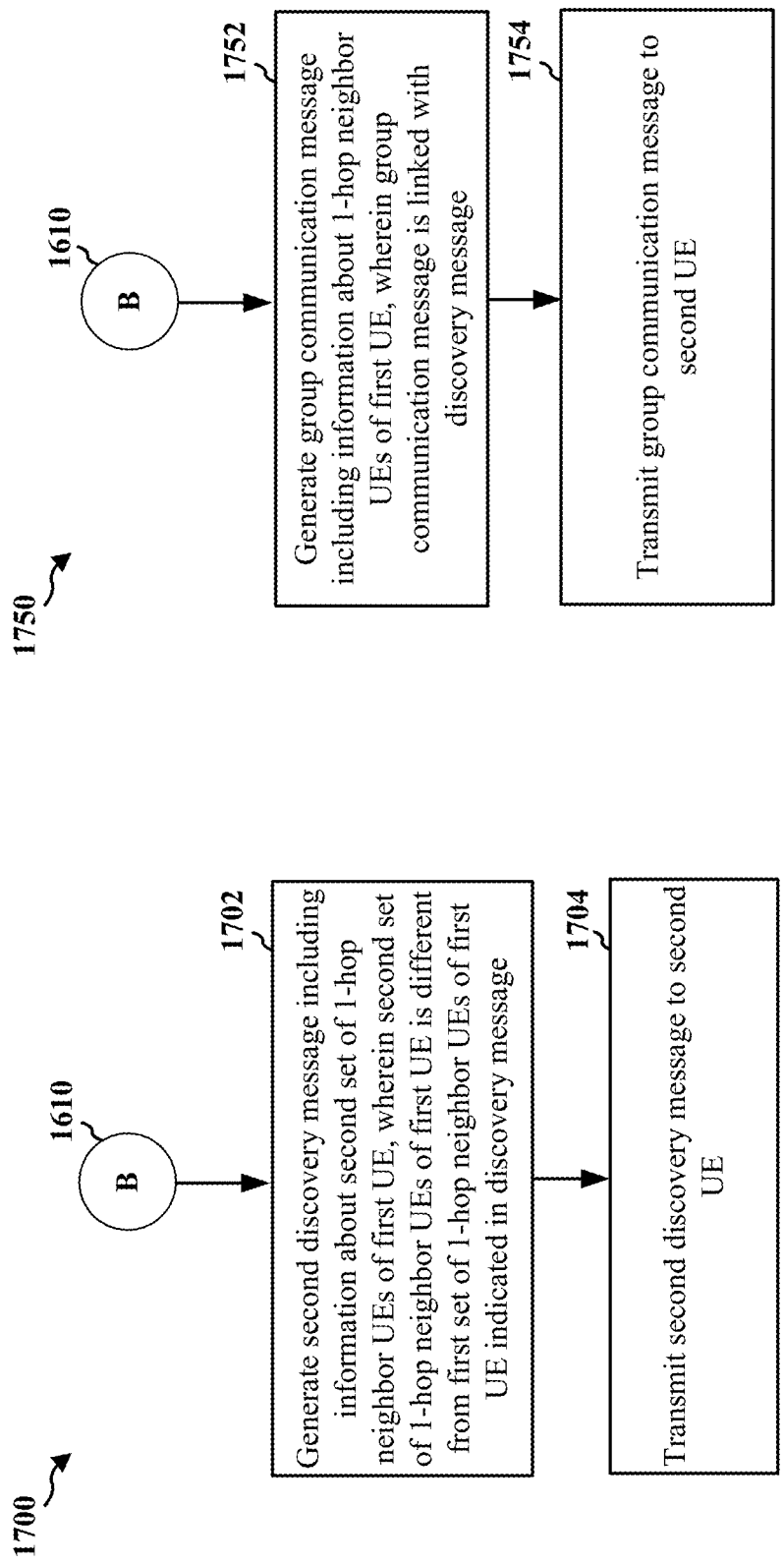
FIG. 17A is a flowchart of a method of wireless communication, expanding from the flowchart of FIG. 16.
FIG. 17B is a flowchart of a method of wireless communication, expanding from the flowchart of FIG. 16.

FIG. 17A is a flowchart 1700 of a method of wireless communication, expanding from the flowchart 1600 of FIG. 16. The method may be performed by a first UE (e.g., the UE 464, the apparatus 1802/1802'). At 1610, the method features may be expanded from the flowchart 1600 of FIG. 16. At 1702, the first UE generates a second discovery message including information about a second set of 1-hop neighbor UEs of the first UE, wherein the second set of the 1-hop neighbor UEs of the first UE is different from a first set of the 1-hop neighbor UEs of the first UE indicated in the discovery message. At 1704, the first UE transmits the second discovery message to the second UE. For example, as discussed supra, a UE may send different discovery messages, where the discovery messages include information about different sets of neighbor UEs and their hierarchy information. For example, as discussed supra, a first discovery message may include information about a first set of neighbor UEs and their hierarchy information and a second discovery message may include information about a second set of neighbor UEs and their hierarchy information, where the first and second sets cover the entire neighbor UEs.

FIG. 17B is a flowchart 1750 of a method of wireless communication, expanding from the flowchart 1600 of FIG. 16. The method may be performed by a first UE (e.g., the UE 464, the apparatus 1802/1802'). At 1610, the method features may be expanded from the flowchart 1600 of FIG. 16. At 1752, the first UE generates a group communication message including information about the 1-hop neighbor UEs of the first UE, wherein the group communication message is linked with the discovery message. At 1754, the first UE transmits the group communication message to the second UE. For example, as discussed supra, the UE may generate a group communication message to indicate one or more neighbor UEs, where the group communication is separate from the discovery message. For example, as discussed supra, The discovery message may include information to indicate when and/or where (which frequency band) the group communication message is sent, such that the UE receiving the discovery message does not need to constantly listen for the group communication message.

Figure 18:
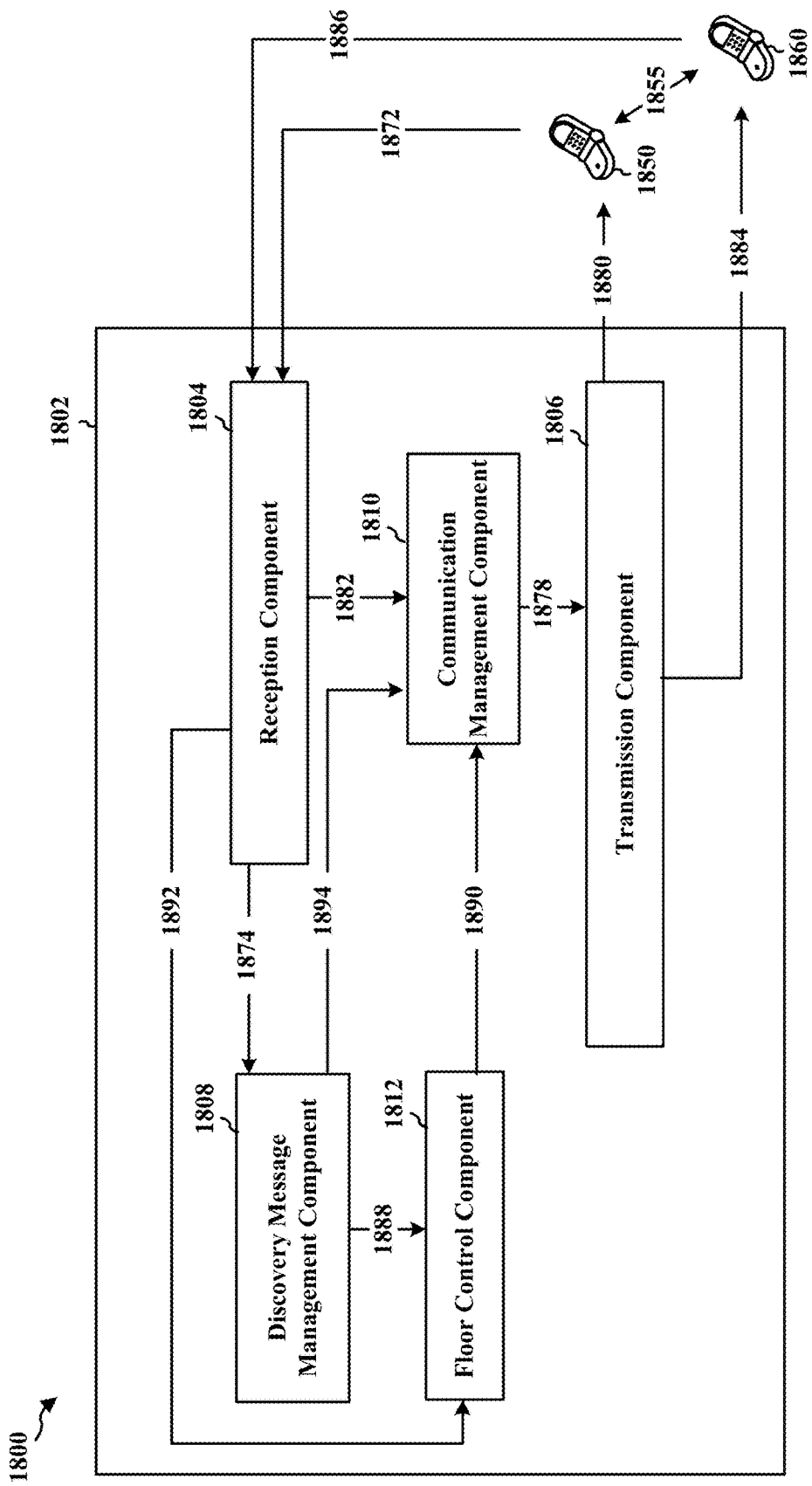
FIG. 18 is a conceptual data flow diagram illustrating the data flow between different means/components in an exemplary apparatus.

FIG. 18 is a conceptual data flow diagram 1800 illustrating the data flow between different means/components in an exemplary apparatus 1802. The apparatus may be a UE (a first UE). The apparatus includes a reception component 1804, a transmission component 1806, a discovery message management component 1808, a communication management component 1810, and a floor control component 1812.

In a first case, a third UE (e.g., a third UE 1860) is considered a 1-hop neighbor UE of a second UE (e.g., a second UE 1850) and is considered a 2-hop neighbor UE of the first UE 1802. In the first case, the discovery message management component 1808 receives via the reception component 1804 a discovery message from a second UE 1850, the discovery message including information about 1-hop neighbor UEs of the second UE 1850, at 1872 and 1874. In an aspect, the first UE may have a first group ID and a first group key ID, and the discovery message includes a second group ID and a second group key ID. The discovery message management component 1808 may attempt to decode the discovery message based on the first group ID and the first group key ID. The discovery management component 1808 may determine the 1-hop neighbor UEs based on the decoded discovery message when both the first group ID and the second group ID are the same and the first group key ID and the second group key ID are the same. In an aspect, the discovery message includes a temporary ID that includes a prefix portion and a suffix portion, the prefix portion includes the second group ID and the second group key ID, and the suffix portion includes at least one identifier indicating said 1-hop neighbor UEs of the second UE. In an aspect, the first group ID is a first layer-2 group ID, and the first group key ID is a first PGK ID. In an aspect, the suffix portion further includes an ID of the second UE, hierarchy information of the second UE, and hierarchy information of the 1-hop neighbor UEs of the second UE. In an aspect, the prefix portion and the suffix portion are encoded based on a hash function, the second group ID, and the second group key ID.

The communication management component 1810 determines to communicate with a third UE 1860 based on the discovery message, the third UE 1860 being one of the 1-hop neighbor UEs of the second UE 1850. The communication management component 1810 requests the second UE 1850 via the transmission component 1806 to operate as a relay for communication between the first UE 1802 and the third UE 1860, at 1878 and 1880. The communication management component 1810 communicates, via the reception component 1804 and the transmission component 1806, with the third UE 1860 through the second UE 1850, at 1878, 1880, 1872, and 1882, and as well as 1855.

In an aspect, the discovery message further includes 2-hop neighbor UEs of the second UE. The communication management component 1810 determines to communicate with a fourth UE (not shown) based on the discovery message, where the fourth UE is one of the 2-hop neighbor UEs of the second UE 1850 and is a 1-hop neighbor UE of the third UE 1860. The communication management component 1810 requests the second UE 1850 and the third UE 1860 via the transmission component 1806 to operate as relays for communication between the first UE 1802 and the fourth UE. The communication management component 1810 communicates with the fourth UE through the second UE and the third UE 1860.

The floor control component 1812 selects one of the second UE 1850 and the 1-hop neighbor UEs of the second UE 1850 as a floor arbitrator UE based on hierarchy information of the second UE 1850 and 1-hop neighbor UEs indicated in the discovery message, at 1888. The floor control component 1812 sends via the communication management component 1810 and the transmission component 1806 a floor request to the floor arbitrator UE, at 1890, 1878, and at 1880 or 1884. At 1806, the floor control component 1812 receives via the reception component 1804 a floor response from the floor arbitrator UE in response to the floor request, at 1892 and at 1872 or 1886. The communication management component 1810 communicates, via the reception component 1804 and the transmission component 1806, with one or more of the 1-hop neighbor UEs of the second UE 1850 and the second UE 1850 based on the floor response, at 1890, 1872, 1886, 1882, 1878, 1880, and 1884. In an aspect, the floor arbitrator UE has a highest hierarchy value among the second UE 1850 and 1-hop neighbor UEs indicated in the discovery message based on the hierarchy information. In an aspect, if the third UE 1860 is selected as the floor arbitrator UE, the second UE 1850 operates as a relay for communication of the floor request and the floor response between the first UE 1802 and the third UE 1860.

The floor control component 1812 may determine that the floor arbitrator UE is no longer available, via the reception component 1804, at 1892. The floor control component 1812 may select another UE of the second UE 1850 and the 1-hop neighbor UEs of the second UE 1850 as a subsequent floor arbitrator UE based on the hierarchy information of the second UE 1850 and 1-hop neighbor UEs, at 1888. In an aspect, the another UE of the second UE 1850 and the 1-hop neighbor UEs of the second UE 1850 as a subsequent floor arbitrator is selected as the subsequent floor arbitrator based on a floor control list, where the floor control list includes a status of a floor control procedure.

In a second case, the third UE 1860 is considered a 1-hop neighbor UE of the first UE 1802, and the second UE 1850 is considered a 1-hop neighbor UE of the first UE 1802. In the second case, the discovery message management component 1808 generates a discovery message including information about 1-hop neighbor UEs of the first UE 1802. The discovery message management component 1808 may forward the discovery message to the communication management component 1810, at 1894. The communication management component 1810 transmits via the transmission component 1806 the discovery message to a second UE 1850, at 1878 and 1880. The communication management component 1810 receives via the reception component 1804 a request from the second UE 1850 to operate as a relay for communication between the first UE 1802 and a third UE 1860, at 1872 and 1882, the third UE 1860 being one of the 1-hop neighbor UEs of the first UE 1802. The communication management component 1810 performs a relay function, via the reception component 1804 and the transmission component 1806, for communication between the first UE 1802 and the third UE 1860 based on the request, at 1872, 1880, 1886, 1884, 1882, and 1878.

In an aspect, the discovery message management component 1808 generates the discovery message by encoding the discovery message by applying a hash function to a group ID and a group key ID that are included in the discovery message, where the group ID and the group key ID are known to UEs that are in a same group as the first UE 1802. In such an aspect, the discovery message includes a temporary ID that includes a prefix portion and a suffix portion, the prefix portion includes the group ID and the group key ID, and the suffix portion includes at least one identifier indicating said 1-hop neighbor UEs of the second UE 1850. In such an aspect, the group ID is a layer-2 group ID, and the group key ID is a PGK ID. In such an aspect, the suffix portion further includes an ID of the first UE 1802, hierarchy information of the first UE 1802, and hierarchy information of the 1-hop neighbor UEs of the first UE 1802.

In an aspect, the discovery message management component 1808 generates the discovery message by selecting one or more of the 1-hop neighbor UEs to be indicated in the discovery message based on at least one of hierarchies of the 1-hop neighbor UEs or signal strength of the 1-hop neighbor UEs, and generating the discovery message including information about the selected one or more of the 1-hop neighbor UEs.

In an aspect, the discovery message management component 1808 generates a second discovery message including information about a second set of 1-hop neighbor UEs of the first UE 1802, where the second set of the 1-hop neighbor UEs of the first UE 1802 is different from a first set of the 1-hop neighbor UEs of the first UE 1802 indicated in the discovery message. The discovery message management component 1808 may forward the second discovery message to the communication management component 1810, at 1894. The communication management component 1810 transmits via the transmission component 1806 the second discovery message to the second UE 1850, at 1878 and 1880.

In an aspect, the discovery message management component 1808 generates a group communication message including information about the 1-hop neighbor UEs of the first UE 1802, where the group communication message is linked with the discovery message. The communication management component 1810 transmits via the transmission component 1806 the group communication message to the second UE 1850.

The apparatus may include additional components that perform each of the blocks of the algorithm in the aforementioned flowcharts of FIGS. 14-17. As such, each block in the aforementioned flowcharts of FIGS. 14-17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
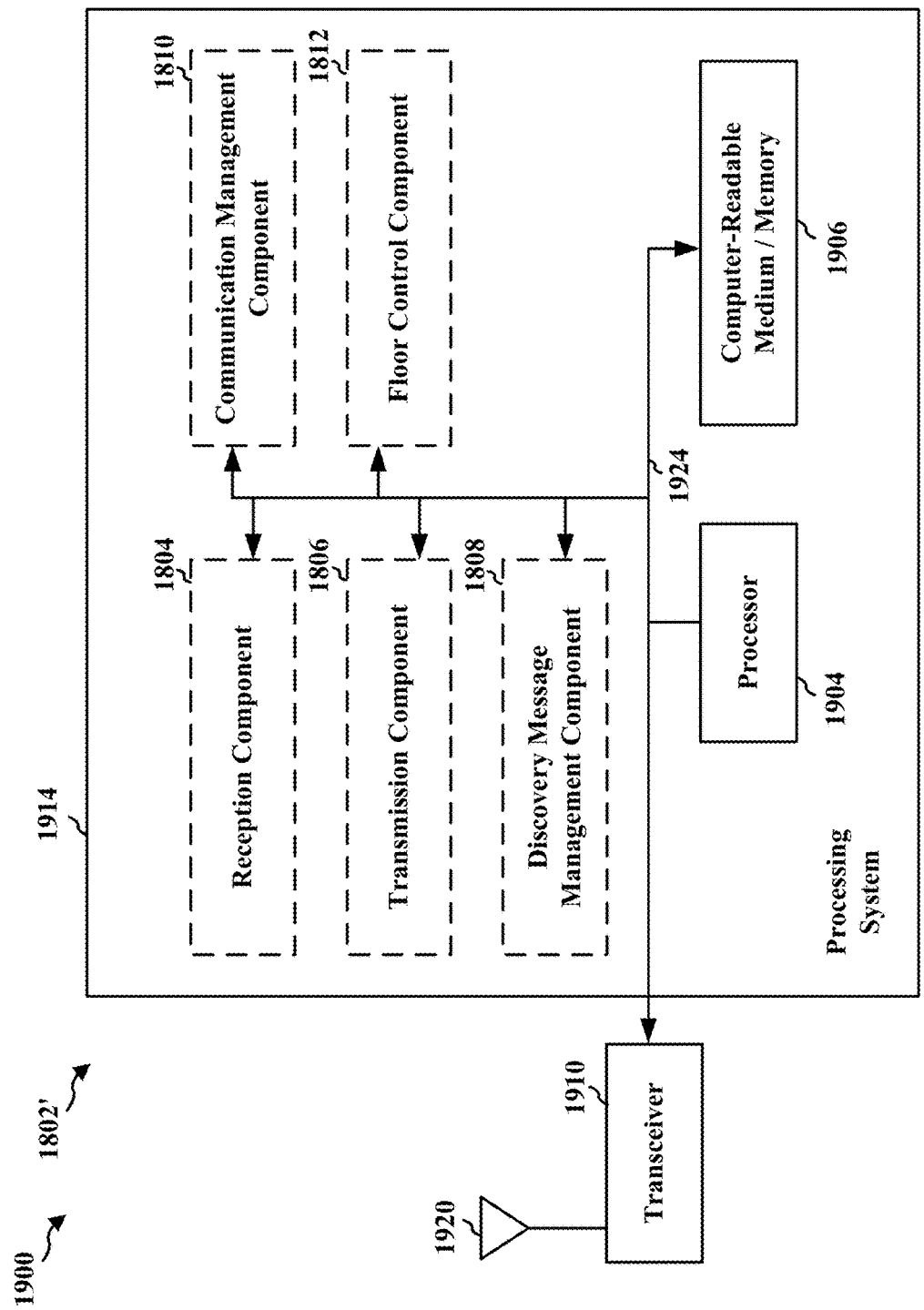
FIG. 19 is a diagram illustrating an example of a hardware implementation for an apparatus employing a processing system.

FIG. 19 is a diagram 1900 illustrating an example of a hardware implementation for an apparatus 1702' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, 1810, 1812, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1806, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1808, 1810, 1812. The components may be software components running in the processor 1904, resident/stored in the computer readable medium/memory 1906, one or more hardware components coupled to the processor 1904, or some combination thereof. The processing system 1914 may be a component of the UE 350 and may include the memory 360 and/or at least one of the TX processor 368, the RX processor 356, and the controller/processor 359.

In one configuration, the apparatus 1802/1802' for wireless communication includes means for receiving a discovery message from a second UE, the discovery message including information about 1-hop neighbor UEs of the second UE, means for determining to communicate with a third UE based on the discovery message, the third UE being one of the 1-hop neighbor UEs of the second UE, means for requesting the second UE to operate as a relay for communication between the first UE and the third UE, and means for communicating with the third UE through the second UE. Where the discovery message further includes 2-hop neighbor UEs of the second UE, the apparatus 1802/1802' further includes means for determining to communicate with a fourth UE based on the discovery message, where the fourth UE is one of the 2-hop neighbor UEs of the second UE and is a 1-hop neighbor UE of the third UE, means for requesting the second UE and the third UE to operate as relays for communication between the first UE and the fourth UE, and means for communicating with the fourth UE through the second UE and the third UE. Where the first UE has a first group ID and a first group key ID, and the discovery message includes a second group ID and a second group key ID, the apparatus 1802/1802' further includes means for attempting to decode the discovery message based on the first group ID and the first group key ID, and means for determining the 1-hop neighbor UEs based on the decoded discovery message when both the first group ID and the second group ID are the same and the first group key ID and the second group key ID are the same. The apparatus 1802/1802' further includes means for selecting one of the second UE and the 1-hop neighbor UEs of the second UE as a floor arbitrator UE based on hierarchy information of the second UE and 1-hop neighbor UEs indicated in the discovery message; means for sending a floor request to the floor arbitrator UE, means for receiving a floor response from the floor arbitrator UE in response to the floor request, and means for communicating with one or more of the 1-hop neighbor UEs of the second UE and the second UE based on the floor response. The apparatus 1802/1802' further includes means for determining that the floor arbitrator UE is no longer available, and means for selecting another UE of the second UE and the 1-hop neighbor UEs of the second UE as a subsequent floor arbitrator UE based on the hierarchy information of the second UE and 1-hop neighbor UEs.

In another configuration, the apparatus 1802/1802' for wireless communication includes means for generating a discovery message including information about 1-hop neighbor UEs of the first UE, means for transmitting the discovery message to a second UE, means for receiving a request from the second UE to operate as a relay for communication between the first UE and a third UE, the third UE being one of the 1-hop neighbor UEs of the first UE, and means for performing a relay function for communication between the first UE and the third UE based on the request. The apparatus 1802/1802' further includes means for generating a second discovery message including information about a second set of 1-hop neighbor UEs of the first UE, where the second set of the 1-hop neighbor UEs of the first UE is different from a first set of the 1-hop neighbor UEs of the first UE indicated in the discovery message, and means for transmitting the second discovery message to the second UE. The apparatus 1802/1802' further includes means for generating a group communication message including information about the 1-hop neighbor UEs of the first UE, where the group communication message is linked with the discovery message, and means for transmitting the group communication message to the second UE.

The aforementioned means may be one or more of the aforementioned components of the apparatus 1802 and/or the processing system 1914 of the apparatus 1802' configured to perform the functions recited by the aforementioned means. As described supra, the processing system 1914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first user equipment (UE), comprising:
    receiving a discovery message from a second UE, the discovery message including information about 1-hop neighbor UEs of the second UE;
    determining to communicate with a third UE based on the discovery message, the third UE being one of the 1-hop neighbor UEs of the second UE;
    requesting the second UE to operate as a relay for communication between the first UE and the third UE;
    selecting one of the second UE and the 1-hop neighbor UEs of the second UE as a floor arbitrator UE based on hierarchy information of the second UE and the 1-hop neighbor UEs indicated in the discovery message; and
    communicating with the third UE through the second UE.

2. The method of claim 1, wherein the discovery message further includes information about 2-hop neighbor UEs of the second UE, and the method further comprises:
    determining to communicate with a fourth UE based on the discovery message, wherein the fourth UE is one of the 2-hop neighbor UEs of the second UE and is a 1-hop neighbor UE of the third UE;
    requesting the second UE and the third UE to operate as relays for communication between the first UE and the fourth UE; and
    communicating with the fourth UE through the second UE and the third UE.

3. The method of claim 1, wherein the first UE has a first group identifier (ID) and a first group key ID, and the discovery message includes a second group ID and a second group key ID, the method further comprising:
    attempting to decode the discovery message based on the first group ID and the first group key ID; and
    determining the 1-hop neighbor UEs based on the decoded discovery message when both the first group ID and the second group ID are the same and the first group key ID and the second group key ID are the same.

4. The method of claim 3, wherein the discovery message includes a temporary identifier (ID) that includes a prefix portion and a suffix portion, the prefix portion includes the second group ID and the second group key ID, and the suffix portion includes at least one identifier indicating said 1-hop neighbor UEs of the second UE.

5. The method of claim 4, wherein the first group ID is a first layer-2 group ID, and the first group key ID is a first proximity service group key ID (PGK ID).

6. The method of claim 4, wherein the suffix portion further includes an ID of the second UE, hierarchy information of the second UE, and hierarchy information of the 1-hop neighbor UEs of the second UE.

7. The method of claim 4, wherein the prefix portion and the suffix portion are encoded based on a hash function, the second group ID, and the second group key ID.

8. The method of claim 1, further comprising:
    sending a floor request to the floor arbitrator UE;
    receiving a floor response from the floor arbitrator UE in response to the floor request; and
    communicating with one or more of the 1-hop neighbor UEs of the second UE and the second UE based on the floor response.

9. The method of claim 8, wherein the floor arbitrator UE has a highest hierarchy value among the second UE and the 1-hop neighbor UEs indicated in the discovery message based on the hierarchy information.

10. The method of claim 8, wherein if the third UE is selected as the floor arbitrator UE, the second UE operates as a relay for communication of the floor request and the floor response between the first UE and the third UE.

11. The method of claim 8, further comprising:
    determining that the floor arbitrator UE is no longer available; and
    selecting another UE of the second UE and the 1-hop neighbor UEs of the second UE as a subsequent floor arbitrator UE based on the hierarchy information of the second UE and 1-hop neighbor UEs.

12. The method of claim 11, wherein the another UE of the second UE and the 1-hop neighbor UEs of the second UE as a subsequent floor arbitrator is selected as the subsequent floor arbitrator based on a floor control list, wherein the floor control list includes a status of a floor control procedure.

13. A method of wireless communication for a first user equipment (UE), comprising:
generating a discovery message including information about 1-hop neighbor UEs of the first UE, the information including one or more of the 1-hop neighbor UEs having been selected to be indicated in the discovery message based on hierarchy information, wherein the discovery message includes a temporary identifier (ID) that includes a prefix portion and a suffix portion, the prefix portion including a group ID and a group key ID, and the suffix portion including an ID of the first UE and hierarchy information of the first UE and the 1-hop neighbor UEs of the first UE;
transmitting the discovery message to a second UE;
receiving a request from the second UE to operate as a relay for communication between the first UE and a third UE, the third UE being one of the 1-hop neighbor UEs of the first UE; and
performing a relay function for communication between the first UE and the third UE based on the request.

14. The method of claim 13, wherein the generating the discovery message comprises:
encoding the discovery message by applying a hash function to the group ID and the group key ID that are included in the discovery message,
wherein the group ID and the group key ID are known to UEs that are in a same group as the first UE.

15. The method of claim 14, wherein the group ID is a layer-2 group ID, and the group key ID is a proximity service group key ID (PGK ID).

16. The method of claim 13, wherein the generating the discovery message comprises:
selecting the one or more of the 1-hop neighbor UEs to be indicated in the discovery message based on the hierarchy information including information of at least one of hierarchies of the 1-hop neighbor UEs or signal strength of the 1-hop neighbor UEs; and
generating the discovery message including information about the selected one or more of the 1-hop neighbor UEs.

17. The method of claim 13, further comprising:
generating a second discovery message including information about a second set of 1-hop neighbor UEs of the first UE, wherein the second set of the 1-hop neighbor UEs of the first UE is different from a first set of the 1-hop neighbor UEs of the first UE indicated in the discovery message; and
transmitting the second discovery message to the second UE.

18. The method of claim 13, further comprising:
generating a group communication message including information about the 1-hop neighbor UEs of the first UE, wherein the group communication message is linked with the discovery message; and
transmitting the group communication message to the second UE.

19. An apparatus for wireless communication, wherein the apparatus is a first user equipment (UE), comprising:
a memory; and
at least one processor coupled to the memory and configured to:
receive a discovery message from a second UE, the discovery message including information about 1-hop neighbor UEs of the second UE;
determine to communicate with a third UE based on the discovery message, the third UE being one of the 1-hop neighbor UEs of the second UE;
request the second UE to operate as a relay for communication between the first UE and the third UE;
select one of the second UE and the 1-hop neighbor UEs of the second UE as a floor arbitrator UE based on hierarchy information of the second UE and the 1-hop neighbor UEs indicated in the discovery message; and
communicate with the third UE through the second UE.

20. The apparatus of claim 19, wherein the discovery message further includes information about 2-hop neighbor UEs of the second UE, and the at least one processor is further configured to:
determine to communicate with a fourth UE based on the discovery message, wherein the fourth UE is one of the 2-hop neighbor UEs of the second UE and is a 1-hop neighbor UE of the third UE;
request the second UE and the third UE to operate as relays for communication between the first UE and the fourth UE; and
communicate with the fourth UE through the second UE and the third UE.

21. The apparatus of claim 19, wherein the first UE has a first group identifier (ID) and a first group key ID, and the discovery message includes a second group ID and a second group key ID, the at least one processor is further configured to:
attempt to decode the discovery message based on the first group ID and the first group key ID; and
determine the 1-hop neighbor UEs based on the decoded discovery message when both the first group ID and the second group ID are the same and the first group key ID and the second group key ID are the same.

22. The apparatus of claim 21, wherein the discovery message includes a temporary identifier (ID) that includes a prefix portion and a suffix portion, the prefix portion includes the second group ID and the second group key ID, and the suffix portion includes at least one identifier indicating said 1-hop neighbor UEs of the second UE.

23. The apparatus of claim 19, wherein the at least one processor is further configured to:
send a floor request to the floor arbitrator UE;
receive a floor response from the floor arbitrator UE in response to the floor request; and
communicate with one or more of the 1-hop neighbor UEs of the second UE and the second UE based on the floor response.

24. The apparatus of claim 23, wherein the floor arbitrator UE has a highest hierarchy value among the second UE and the 1-hop neighbor UEs indicated in the discovery message based on the hierarchy information.

25. The apparatus of claim 23, wherein if the third UE is selected as the floor arbitrator UE, the second UE operates as a relay for communication of the floor request and the floor response between the first UE and the third UE.

26. The apparatus of claim 23, wherein the at least one processor is further configured to:
determine that the floor arbitrator UE is no longer available; and
select another UE of the second UE and the 1-hop neighbor UEs of the second UE as a subsequent floor arbitrator UE based on the hierarchy information of the second UE and 1-hop neighbor UEs.

27. The apparatus of claim 26, wherein the another UE of the second UE and the 1-hop neighbor UEs of the second UE as a subsequent floor arbitrator is selected as the subsequent floor arbitrator based on a floor control list, wherein the floor control list includes a status of a floor control procedure.

28. An apparatus for wireless communication, wherein the apparatus is a first user equipment (UE), comprising:
   a memory; and
   at least one processor coupled to the memory and configured to:
      generate a discovery message including information about 1-hop neighbor UEs of the first UE, the information including one or more of the 1-hop neighbor UEs having been selected to be indicated in the discovery message based on hierarchy information, wherein the discovery message includes a temporary identifier (ID) that includes a prefix portion and a suffix portion, the prefix portion including a group ID and a group key ID, and the suffix portion including an ID of the first UE and hierarchy information of the first UE and the 1-hop neighbor UEs of the first UE;
      transmit the discovery message to a second UE;
      receive a request from the second UE to operate as a relay for communication between the first UE and a third UE, the third UE being one of the 1-hop neighbor UEs of the first UE; and
   perform a relay function for communication between the first UE and the third UE based on the request.

* * * * *